US010679080B2

(12) United States Patent
Nomura et al.

(10) Patent No.: US 10,679,080 B2
(45) Date of Patent: Jun. 9, 2020

(54) DIGITAL SIGNAGE CONTROL DEVICE, DIGITAL SIGNAGE CONTROL METHOD, AND NON-TRANSITORY COMPUTER-READABLE STORAGE MEDIUM STORING PROGRAM

(71) Applicants: TOYOTA JIDOSHA KABUSHIKI KAISHA, Toyota-shi, Aichi-ken (JP); TOYOTA Connected Corporation, Nagoya-shi, Aichi-ken (JP)

(72) Inventors: Masakazu Nomura, Nagoya (JP); Masato Endo, Nagakute (JP); Naoki Yamamuro, Nagoya (JP)

(73) Assignees: TOYOTA JIDOSHA KABUSHIKI KAISHA, Toyota-shi (JP); TOYOTA Connected Corporation, Nagoya-shi (JP)

( * ) Notice: Subject to any disclaimer, the term of this patent is extended or adjusted under 35 U.S.C. 154(b) by 120 days.

(21) Appl. No.: 16/057,075

(22) Filed: Aug. 7, 2018

(65) Prior Publication Data

US 2019/0050656 A1 Feb. 14, 2019

(30) Foreign Application Priority Data

Aug. 10, 2017 (JP) ................................ 2017-155830

(51) Int. Cl.
*G06K 9/00* (2006.01)
*G06F 3/14* (2006.01)

(52) U.S. Cl.
CPC .......... *G06K 9/00845* (2013.01); *G06F 3/14* (2013.01); *G06K 9/00335* (2013.01); *G06K 9/00771* (2013.01)

(58) Field of Classification Search
CPC .......... G06K 9/00845; G06K 9/00335; G06K 9/00771; G06F 3/14; G06F 3/147; G09G 2380/10; G09G 2380/06; G09F 9/30
See application file for complete search history.

(56) References Cited

U.S. PATENT DOCUMENTS

2013/0096828 A1* 4/2013 Fujimoto .......... G01C 21/3676 701/533
2016/0066012 A1* 3/2016 Friedlander .......... G06F 16/285 725/34
2016/0180709 A1 6/2016 Rider et al.

FOREIGN PATENT DOCUMENTS

JP 2004-178314 A 6/2004
JP 2007-265286 A 10/2007

* cited by examiner

*Primary Examiner* — Phuoc Tran
(74) *Attorney, Agent, or Firm* — Hunton Andrews Kurth LLP

(57) ABSTRACT

A digital signage control device includes a display controller that displays information on a digital signage installed in the vicinity of a predetermined road, a target vehicle detector that detects a target vehicle located in a predetermined range on the road in which an occupant visually recognizes the digital signage, and a visual recognition frequency information acquisition unit that acquires visual recognition frequency information on a frequency at which the occupant of the target vehicle visually recognizes the information on the digital signage. The display controller changes content of information to be displayed on the digital signage according to the visual recognition frequency information.

12 Claims, 13 Drawing Sheets

5

52
PROCESSING APPARATUS
5201 COMMUNICATION PROCESSING UNIT
5202 VEHICLE MOVEMENT INFORMATION ACCUMULATION PROCESSING UNIT
5203 NUMBER-OF-PASSES SPECIFYING UNIT
5204 TARGET DIGITAL SIGNAGE INFORMATION ACQUISITION UNIT
5205 TARGET VEHICLE DETECTOR
5206 VISUAL RECOGNITION FREQUENCY INFORMATION ACQUISITION UNIT
5207 INFORMATION DISTRIBUTION UNIT
5200 STORAGE UNIT
5200A MAP INFORMATION DB
5200B PROBE INFORMATION DB
5200C VEHICLE MOVEMENT HISTORY DB
5200D VEHICLE INFORMATION DB
5200E DIGITAL SIGNAGE INFORMATION DB
5200F NUMBER-OF-PASSES INFORMATION DB
5200G ADVERTISEMENT DB

| | INDIVIDUAL INFORMATION |
|---|---|
| 1 | BRAND NAME |
| 2 | STORE NAME |
| 3 | POSITION GUIDANCE INFORMATION |
| 4 | SALE INFORMATION |
| 5 | COUPON INFORMATION |
| 6 | OTHER INFORMATION |

1
CENTER SERVER
5
52
PROCESSING APPARATUS
51
COMMUNICATION APPARATUS
NW1
NW3
NW2
VEHICLE
3
31
DCM
32
ECU
33
GPS MODULE
34
ACC SWITCH
35
VEHICLE SPEED SENSOR
4
41
COMMUNICATION APPARATUS
42
PROCESSING APPARATUS
GPS MODULE
43
ACCELERATION SENSOR
44
45
7
DIGITAL SIGNAGE APPARATUS

DIGITAL SIGNAGE CONTROL DEVICE, DIGITAL SIGNAGE CONTROL METHOD, AND NON-TRANSITORY COMPUTER-READABLE STORAGE MEDIUM STORING PROGRAM

INCORPORATION BY REFERENCE

The disclosure of Japanese Patent Application No. 2017-155830 filed on Aug. 10, 2017 including the specification, drawings and abstract is incorporated herein by reference in its entirety.

BACKGROUND

1. Technical Field

The present disclosure relates to a digital signage control device, a digital signage control method, and a non-transitory computer-readable storage medium storing a program.

2. Description of Related Art

A digital signage for an occupant of a vehicle including a driver getting on the vehicle is known (see, for example, US2016/0180709A).

SUMMARY

However, when the same information is continuously displayed on the digital signage, effects of providing information to the driver or the occupant (hereinafter referred to as an "occupant") of the vehicle through the digital signage is likely to be degraded. For example, for a user frequently passing through a road in the vicinity of the digital signage, the information displayed on the digital signage is known information, and effects of information provision are likely to be degraded.

The present disclosure provides a digital signage control device, a digital signage control method, and a non-transitory computer-readable storage medium storing a program which are capable of further improving effects of information provision through digital signage.

A first aspect of the present disclosure relates to a digital signage control device including circuitry. The circuitry is configured to display information on a digital signage installed in the vicinity of a predetermined road. The circuitry is configured to detect a target vehicle located in a predetermined range on the road in which an occupant visually recognizes the digital signage. The circuitry is configured to acquire visual recognition frequency information on a frequency at which the occupant of the target vehicle visually recognizes the information on the digital signage. The circuitry is configured to change content of information to be displayed on the digital signage according to the visual recognition frequency information.

According to the first aspect of the present disclosure, the digital signage control device can change the content of the information to be displayed on the digital signage in consideration of the frequency at which the occupant of the target vehicle detected in the vicinity of the digital signage visually recognizes the information on the digital signage based on the visual recognition frequency information. Accordingly, the digital signage control device can display information different from normally displayed information, for example, to an occupant frequently passing through the vicinity of the digital signage by the vehicle and having a relatively high visual recognition frequency of information on the digital signage. Therefore, it is possible to further curtail tiredness of the occupant having a relatively high visual recognition frequency of the information on the digital signage, and further improve effects of providing the information through the digital signage.

In the digital signage control device according to the first aspect of the present disclosure, the circuitry may be configured to collect movement history information including position information from the target vehicle or a mobile terminal carried by a target occupant getting on the target vehicle. The circuitry may be configured to acquire; the number of times the target vehicle passes through the vicinity of the digital signage specified based on the movement history information as the visual recognition frequency information, or the number of times the target occupant passes through the vicinity of the digital signage while in the vehicle specified based on the movement history information as the visual recognition frequency information. The circuitry may be configured to change the content of the information to be displayed on the digital signage according to the number of passes acquired by the visual recognition frequency information acquisition unit.

According to the first aspect of the present disclosure, the digital signage control device can acquire the number of times the target vehicle or the target occupant has passed through the vicinity of the digital signage based on the movement history information of the target vehicle detected in the vicinity of the digital signage or a mobile terminal carried by the occupant of the target vehicle (target occupant). Accordingly, the digital signage control device can change the content of the information to be displayed on the digital signage specifically in consideration of the visual recognition frequency of the digital signage of the occupant of the target vehicle based on the number of times the target vehicle or the like has passed through the vicinity of the digital signage.

In the digital signage control device according to the first aspect of the present disclosure, the circuitry may be configured to determine whether or not the occupant getting on the target vehicle is in a situation in which the occupant grasps the content of the digital signage when the target vehicle has passed through the vicinity of the digital signage or whether or not the target occupant is in a situation in which the occupant grasps the content of the digital signage when the vehicle on which the target occupant gets passes through the vicinity of the digital signage. The circuitry may be configured to acquire the number of times the target vehicle passes through the vicinity of the digital signage in a situation in which a result of the determination by the determination unit corresponds to a positive determination, from among a total number of times the target vehicle passes through the vicinity of the digital signage, or the number of times the vehicle on which the target occupant gets passes through the vicinity of the digital signage in a situation in which the result of the determination by the determination unit corresponds to a positive determination, from among a total number of times the target occupant passes through the vicinity of the digital signage while in the vehicle.

According to the first aspect of the present disclosure, the digital signage control device can acquire the number of passes corresponding to the number of times the occupant has actually visually recognized the information on the digital signage while excluding the number of passes in a situation in which the occupant is likely not to be able to visually recognize the digital signage from the total number of passes.

In the digital signage control device according to the first aspect of the present disclosure, the circuitry may be configured to determine that the occupant getting on the target vehicle or the target occupant is in a situation in which the occupant is unable to grasp the content of the digital signage when at least one of following condition i), ii) and iii) is satisfied during the target vehicle or the vehicle on which the target occupant gets passes through the vicinity of the digital signage, i) a vehicle speed of the target vehicle or the vehicle on which the target occupant gets is equal to or higher than a predetermined speed, ii) the digital signage is in a backlit state when the digital signage is viewed from the occupant getting on the target vehicle or the target occupant, and iii) surroundings of the digital signage is under a predetermined bad weather.

According to the first aspect of the present disclosure, the digital signage control device can specifically determine a case of a relatively high vehicle speed, a case of a backlit state, or a case of bad weather not to be a situation in which the content of the digital signage can be recognized.

In the digital signage control device according to the first aspect of the present disclosure, the circuitry may be configured to display basic information related to a predetermined target and position guidance information of a place related to the predetermined target when the number of passes acquired by the circuitry is relatively small. The display controller may be configured to display the basic information and at least one of detailed information, supplementary information, and latest information related to the target on the digital signage when the number of passes acquired by the circuitry.

According to the first aspect of the present disclosure, the digital signage control device can provide, for example, position guidance information, in addition to the basic information on a predetermined target such as a product or a store to the occupant having a relatively low visual recognition frequency of the digital signage. Therefore, the digital signage control device can cause the occupant having the relatively low visual recognition frequency of the digital signage to recognize the basic information related to the target, such as an information target and a place related to the target. On the other hand, the digital signage control device can provide the detailed information, the supplementary information, the latest information, and the like in addition to the basic information to the occupant having a relatively high visual recognition frequency of the digital signage. Accordingly, specifically, it is possible to further curtail tiredness of the occupant having a relatively high visual recognition frequency of the digital signage, and further improve effects of providing information through the digital signage.

In the digital signage control device according to the first aspect of the present disclosure, a plurality of pieces of candidate information that is a candidate to be displayed on the digital signage may be predefined and priorities may be predefined in the pieces of candidate information, and the circuitry may be configured to display candidate information having a relatively higher priority among the pieces of candidate information on the digital signage when the number of passes acquired by the circuitry. The circuitry may be configured to display candidate information having a relatively lower priority among the pieces of candidate information on the digital signage when the number of passes acquired by the circuitry.

According to the first aspect of the present disclosure, since the digital signage control device provides information with a relatively high priority to an occupant of which the visual recognition frequency of the digital signage is relatively low, it is possible to cause information having a relatively high priority to be visually recognized by more occupants. Since the digital signage control device provides information with a relatively low priority to the occupant having a relatively high visual recognition frequency of the digital signage, it is possible to further curtail tiredness of the occupant and, specifically, to further improve effects of information provision through the digital signage.

In the digital signage control device according to the first aspect of the present disclosure, the circuitry may be configured to acquire, as the visual recognition frequency information, attribute information on whether or not an owner of the target vehicle or a target occupant getting on the target vehicle is a resident in a predetermined area including an installation position of the digital signage. The circuitry may be configured to make content of information to be displayed on the digital signage different between a case where the owner or the target occupant is the resident in the area and a case where the owner or the target occupant is not the resident in the area, based on the attribute information.

According to the first aspect of the present disclosure, when the owner or the occupant of the vehicle is a resident in the predetermined area including the installation position of the digital signage, that is, when the owner or the occupant is a local resident, the digital signage control device can determine that the visual recognition frequency is relatively high. On the other hand, when the owner of the vehicle or the occupant is not the resident in the area, that is, when the owner or the occupant of the vehicle is a tourist or the like coming from another area, the digital signage control device can determine that the visual recognition frequency of the digital signage is relatively low. Therefore, the digital signage control device can specifically make the content to be displayed on the digital signage different between a case where the owner or the occupant of the target vehicle is the resident in the area and a case where the owner or the occupant of the target vehicle is not the resident in the area in consideration of the visual recognition frequency of the digital signage of the occupant of the target vehicle.

In the digital signage control device according to the first aspect of the present disclosure, the circuitry may be configured to: collect movement history information including position information from the target vehicle or a mobile terminal carried by the target occupant; and acquire visit history information on a visit history indicating that the target vehicle or the target occupant has visited a place related to a predetermined target in information to be displayed on the digital signage, the visit history information being generated based on the movement history information. The circuitry may be configured to change content of the information to be displayed on the digital signage based on the visit history information.

According to the first aspect of the present disclosure, the digital signage control device can change the content to be displayed on the digital signage in consideration of the visit history of the target vehicle or the like with respect to the place related to the predetermined target in the information to be displayed on the digital signage, such as a store where target products of the advertisement information are sold or a target facility of the advertisement information. Therefore, for example, when the target vehicle or the like has not visited a target store of the advertisement information, the digital signage control device can display basic information such as a brand name and basic information such as position guidance information on the digital signage in order to cause the target store to be recognized. On the other hand, when the target vehicle or the like has visited the target store of the advertisement information, the digital signage control device can display additional information such as supply information in order to cause interest. Therefore, it is possible to further curtail tiredness of the occupant of the vehicle passing through the vicinity of the digital signage and to further improve effects of providing information through the digital signage.

In the digital signage control device according to the first aspect of the present disclosure, the circuitry may be configured to acquire information on whether or not the target vehicle or the target occupant has visited the place as the visit history information. The circuitry may be configured to display basic information related to the predetermined target and position guidance information on the place on the digital signage when the visit history information indicates that the target vehicle or the target occupant has not visited the place. The circuitry may be configured to display the basic information, and at least one of detailed information, supplementary information, and latest information related to the predetermined target on the digital signage when the visit history information indicates that the target vehicle or the target occupant has visited the place.

According to the first aspect of the present disclosure, the digital signage control device can provide basic information and position guidance information related to a predetermined target to an occupant who has not visited the place related to the predetermined target. Accordingly, the digital signage control device can cause the occupant who has not visited the place related to the digital signage to recognize basic information related to the target such as a target of the information and the place related to the target. On the other hand, the digital signage control device can provide the detailed information, the supplementary information, the latest information, and the like in addition to the basic information, instead of the position guidance information, to an occupant who has visited the place related to the predetermined target. Accordingly, specifically, it is possible to further curtail tiredness of occupants who have visited the place related to the target of the information displayed in the digital signage, and further improve effects of providing information through the digital signage.

In the digital signage control device according to the first aspect of the present disclosure, the circuitry may be configured to acquire information on whether or not the target vehicle or the target occupant has visited the place as the visit history information. The circuitry may be configured to display candidate information related to the place indicated by the visit history information as a place that the target vehicle or the target occupant has not visited among a plurality of predefined candidate information on the digital signage.

According to the first aspect of the present disclosure, the digital signage control device can display the candidate information related to the place where there is no visit history of the target vehicle among the pieces of candidate information, that is, candidate information that the occupant of the target vehicle (a target occupant) is likely not to know on the digital signage.

A second aspect of the present disclosure relates to a digital signage control method. The digital signage control method includes displaying information on a digital signage installed in the vicinity of a predetermined road; detecting a target vehicle located in a predetermined range on the road in which an occupant visually recognizes the digital signage; and acquiring visual recognition frequency information on a frequency at which the occupant of the target vehicle visually recognizes the information on the digital signage. In the displaying of the information, content of information to be displayed on the digital signage is changed according to the visual recognition frequency information.

A third aspect of the present disclosure relates to a non-transitory computer-readable storage medium storing a program. The program causes a computer to execute a display control step of displaying information on a digital signage installed in the vicinity of a predetermined road, a target vehicle detection step of detecting a target vehicle located in a predetermined range on the road in which an occupant visually recognizes the digital signage, and a visual recognition frequency information acquisition step of acquiring visual recognition frequency information on a frequency at which the occupant of the target vehicle visually recognizes the information on the digital signage. In the display control step, content of information to be displayed on the digital signage is changed according to the visual recognition frequency information.

According to the aspects of the present disclosure, it is possible to provide a digital signage control device, a digital signage control method, and a non-transitory computer-readable storage medium storing a program which are capable of further improving effects of information provision through digital signage.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, modes for carrying out the disclosure will be described with reference to the drawings.

First Embodiment

Configuration of Information Distribution System

First, a configuration of the information distribution system 1 according to the first embodiment will be described with reference to FIGS. 1 to 3.

Figure 1:
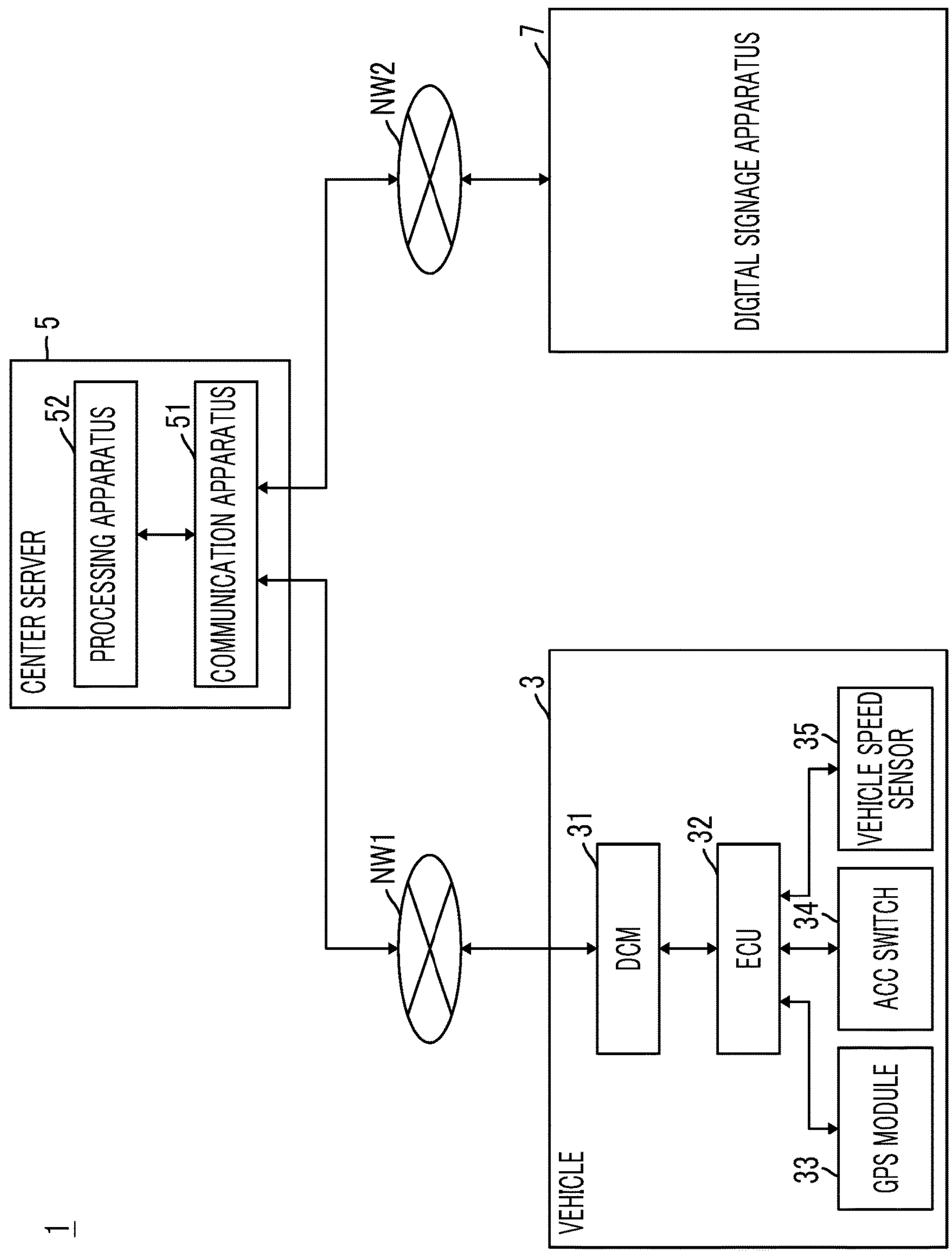
FIG. 1 is a diagram schematically illustrating an example of a configuration of an information distribution system according to a first embodiment.

FIG. 1 is a diagram schematically illustrating a configuration of the information distribution system 1 according to a first embodiment. FIG. 2 is a functional block diagram schematically illustrating an example of a functional configuration of a vehicle 3 according to the first embodiment. FIG. 3 is a functional block diagram schematically illustrating an example of a functional configuration of a center server 5 according to the first embodiment.

The information distribution system 1 includes a plurality of vehicles 3, a plurality of digital signage apparatuses 7 installed in the vicinity of any road, for example, a roadside zone of the road or directly above the road, and a center server 5 communicatively connected to the vehicles 3 and the digital signage apparatuses 7. The information distribution system 1 distributes advertisement information for an occupant of the vehicle 3 located on a road adjacent to an installation position of the digital signage apparatus 7 to the digital signage apparatus 7.

The configurations related to the information distribution systems 1 in the respective vehicles 3 are substantially the same. The configurations related to the information distribution system 1 in the respective digital signage apparatuses 7 are substantially the same. Therefore, in FIG. 1, one vehicle 3 and one digital signage apparatus 7 are representatively illustrated. Hereinafter, the same applies to FIG. 9.

The vehicle 3 includes a data communication module (DCM) 31, an electronic control unit (ECU) 32, a global positioning system (GPS) module 33, an adaptive cruise control (ACC) switch 34, and a vehicle speed sensor 35.

The DCM 31 is a communication device that performs bidirectional communication with the center server 5 via a predetermined communication network NW1 including a mobile telephone network having a plurality of base stations as terminals, an internet network, or the like (hereinafter, the same also applies to communication networks NW2 and NW3). The DCM 31 is connected to various ECUs including the ECU 32 so that the DCM 31 and the ECUs can communicate with each other over an in-vehicle network such as a controller area network (CAN).

The ECU 32 is an electronic control unit that performs various control processes regarding a predetermined function in the vehicle 3. For example, the ECU 32 performs a process of acquiring various types of information (vehicle information) on a state of the vehicle 3 (a vehicle state), a state of an occupant of the vehicle 3, a state of the surroundings of the vehicle 3, and the like, and uploading the information as probe information to the center server 5 via the DCM 31. The function of the ECU 32 may be realized by any hardware, any software, a combination of any hardware and any software, or the like. For example, the ECU 32 may be mainly configured of a microcomputer including a central processing unit (CPU), a RAM (Random Access Memory), a read only memory (ROM), an auxiliary storage device, and an input-output (I/O) Interface. The ECU 32 includes, for example, a vehicle information acquisition unit 321, a map matching unit 322, a probe information transmission unit 323 as functional units that are realized by executing one or more programs stored in the ROM or the auxiliary storage device on the CPU. The ECU 32 includes a storage unit 320 as a storage area that is defined in an internal memory of the auxiliary storage device or the like. In the storage unit 320, a map information database (DB) 320A is stored.

Some of the functions of the ECU 32 may be shared by one or a plurality of other ECUs.

The vehicle information acquisition unit 321 acquires the vehicle information input from the GPS module 33, the ACC switch 34, the vehicle speed sensor 35, and the like from a buffer or the like in the RAM. Specifically, the vehicle information acquisition unit 321 acquires position information of the vehicle 3 input from the GPS module 33. The vehicle information acquisition unit 321 acquires an ON/OFF signal of the ACC switch 34 input from the ACC switch 34. The vehicle information acquisition unit 321 acquires information (vehicle speed information) on the vehicle speed of the vehicle 3 input from the vehicle speed sensor 35.

The map matching unit 322 specifies a road link corresponding to the position information of the vehicle 3, that is, a road link where the vehicle 3 is currently located based on the map information DB 320A stored in the storage unit 320 and the position information of the vehicle 3 acquired by the vehicle information acquisition unit 321. For example, identification information, that is, a link identifier (ID) is defined in each of a plurality of road links constituting a road network included in the map information DB 320A. The map matching unit 322 specifies the link ID of the road link where the vehicle 3 is currently located.

Geographic information system (GIS) data including a node corresponding to an intersection, a road link corresponding to a road between adjacent intersections, that is, a road link connecting the nodes, a line or a polygon corresponding to a planimetric feature such as each building or road, or the like is included in the map information DB 320A. Hereinafter, the same applies to a map information DB 5200A to be described below.

The probe information transmission unit 323 generates probe information including various types of vehicle information acquired by the vehicle information acquisition unit 321, the road link ID specified by the map matching unit 322, time information corresponding to various types of vehicle information, and the like, in a predetermined period. The probe information transmission unit 323 transmits the generated probe information to the center server 5 via the DCM 31. The probe information includes the position information of the vehicle 3, the time information corresponding to the position information of the vehicle 3, a link ID corresponding to the position information of the vehicle 3, and information on movement of each vehicle 3 (vehicle movement information) including information on activation and stop of the vehicle 3. Hereinafter, in the first embodiment, information (ACC-ON information) indicating that the ACC switch 34 is turned ON from an OFF state is adopted as information on the activation of the vehicle 3, and information (ACC-OFF information) indicating that the ACC switch 34 is turned OFF from an ON state is adopted as information on the stop of the vehicle 3.

The probe information transmitted from the vehicle 3 to the center server 5 may not include the time information corresponding to various types of vehicle information. In this case, the center server 5 may use a transmission time of the vehicle movement information in the vehicle 3, a reception time of the vehicle movement information in the center server 5, or an estimation time corresponding to the position information of the vehicle 3 that is calculated from the above-described time, or the like, as the time information corresponding to various types of vehicle information. The center server 5 may add the time information to the probe information as the time information corresponding to various types of vehicle information in the probe information received from the vehicle 3.

The GPS module 33 receives GPS signals transmitted from three or more satellites, desirably, four or more satellites above the vehicle 3, and measures the position of the vehicle 3 on which the GPS module 33 is mounted. The GPS module 33 is communicatively connected to the ECU 32 or the like through a one-to-one communication line or an in-vehicle network such as a CAN. The measured position information of the vehicle 3 is input to the ECU 32 or the like.

The ACC switch 34 turns ON/OFF an accessory power supply of the vehicle 3 according to a predetermined operation performed by an occupant such as a driver of the vehicle 3. For example, the ACC switch 34 is turned on/off according to an operation with respect to a power switch (a button type switch for operating the ACC switch 34 and an ignition switch (IG switch)) provided in an instrumental panel in the vicinity of a steering wheel of a driver's seat in a vehicle cabin. The ACC switch 34 is communicatively connected to the ECU 32 or the like through a one-to-one communication line or an in-vehicle network such as a CAN, and a state signal (an ON signal/OFF signal) of the ACC switch 34 is input to the ECU 32.

The vehicle speed sensor 35 is known detection means for detecting a vehicle speed of the vehicle 3. The vehicle speed sensor 35 is communicatively connected to the ECU 32 or the like through a one-to-one communication line or an in-vehicle network such as a CAN, and vehicle speed information of the vehicle 3 is input to the ECU 32.

The digital signage apparatus 7 (an example of a digital signage) is installed in the vicinity of a predetermined road and displays advertisement information (an advertisement image) distributed from the center server 5 over a predetermined communication network NW2 on a display unit of the digital signage apparatus 7, for example, a liquid crystal display. As described above, the advertisement information displayed on the digital signage apparatus 7 can be visually recognized by, for example, the vehicle 3 traveling on the road or a pedestrian walking on the road.

The center server 5 collects the probe information from the vehicle 3 and accumulates the probe information. The center server 5 distributes the advertisement information to the digital signage apparatus 7 such that the advertisement information is displayed. The center server 5 (an example of the digital signage control device) detects the vehicle 3 traveling in the vicinity of the digital signage apparatus 7 based on the probe information collected from the vehicle 3 controls the information to be displayed on the digital signage apparatus 7 according to the detected vehicle 3. The center server 5 includes a communication apparatus 51 and a processing apparatus 52.

The function of the center server 5 may be realized by a plurality of servers.

The communication apparatus 51 is a device that performs bidirectional communication with each of the vehicles 3 and the digital signage apparatuses 7 over the predetermined communication networks NW1 and NW2 under control of the processing apparatus 52 (specifically, the communication processing unit 5201).

The processing apparatus 52 executes various control processes in the center server 5. The processing apparatus 52 is mainly configured of one or a plurality of server computers including, for example, a CPU, a RAM, a ROM, an auxiliary storage device, an I/O, and the like. The processing apparatus 52 includes a communication processing unit 5201, a vehicle movement information accumulation processing unit 5202, a number-of-passes specifying unit 5203, a target digital signage information acquisition unit 5204, a target vehicle detector 5205, a visual recognition frequency information acquisition unit 5206, and an information distribution unit 5207 as functional units that are realized by executing one or more programs stored in the ROM or the auxiliary storage device on the CPU. The processing apparatus 52 includes, for example, a storage unit 5200 as a storage area defined in an auxiliary storage device of the server computer or an external storage device connected to the server computer. In the storage unit 5200, a map information DB 5200A, a probe information DB 5200B, a vehicle movement history DB 5200C, a vehicle information DB 5200D, a digital signage information DB 5200E, a number-of-passes information DB 5200F, and an advertisement DB 5200G are stored.

The communication processing unit 5201 controls the communication apparatus 51 to perform transmission and reception of various signals (a control signal, an information signal, and the like) to and from each of the vehicles 3.

The vehicle movement information accumulation processing unit 5202 (an example of the movement history information collection unit) performs a process on the vehicle movement information sequentially received from the respective vehicles 3 by the communication processing unit 5201 and accumulating resultant information as the movement history of the vehicle 3 (Vehicle movement history) in the vehicle movement history DB 5200C. For example, the vehicle movement information accumulation processing unit 5202 generates information on the movement history (trip information) in each period from the activation of the respective vehicles 3 to the stop, that is, each trip based on time-series data of the vehicle movement information of the respective vehicles 3 stored in the probe information DB 5200B. In other words, the vehicle movement information accumulation processing unit 5202 generates trip information from a departure place to a destination for each trip of the vehicle 3. Specifically, the vehicle movement information accumulation processing unit 5202 determines activation of the vehicle 3 based on the ACC-ON information included in the vehicle movement information and defines the position information of the vehicle 3 included in the vehicle movement information including the ACC-ON information as a starting point (a departure place) of a current trip of the vehicle 3. The vehicle movement information accumulation processing unit 5202 defines the position information of the vehicle 3 included in the latest vehicle movement information including the ACC-OFF information in the vehicle movement information after the vehicle movement information in time series as an ending point (a destination) of the current trip of the vehicle 3. The vehicle movement information accumulation processing unit 5202 unifies two pieces of vehicle movement information related to both the starting point and the ending point of one trip of the vehicle 3 and a plurality of pieces of vehicle movement information (a vehicle movement information group) between the two pieces of vehicle movement information in time series to generate trip information. The vehicle movement information accumulation processing unit 5202 stores the generated trip information of the respective vehicles 3 in the vehicle movement history DB 5200C in association with the identification information of the corresponding vehicle 3, such as a vehicle index number (VIN), a predetermined vehicle ID, or the like, as a movement history of the respective vehicles 3.

The process in the vehicle movement information accumulation processing unit 5202 may be executed in real time in correspondence to the probe information sequentially received from the respective vehicles 3 by the communication processing unit 5201, and may be executed on unprocessed probe information accumulated to a certain extent in the probe information DB 5200B. The identification information of the respective vehicles 3 is registered in the vehicle information DB 5200D in advance.

The number-of-passes specifying unit 5203 specifies, for the respective digital signage apparatuses 7, the total number of times the respective vehicles 3 have passed through the vicinity of the digital signage apparatus 7 (total number of passes). "Pass through the vicinity of the digital signage apparatus 7" means passing through the front of the digital signage apparatus 7 when the digital signage apparatus 7 is disposed in a roadside zone of the road and means passing under the digital signage apparatus 7 when the digital signage apparatus 7 is disposed directly above the road. For example, the number-of-passes specifying unit 5203 calculates the total number of passes based on the information on installation positions of the respective digital signage apparatuses 7 registered in the digital signage information DB 5200E and the vehicle movement history of the respective vehicles 3 stored in the vehicle movement history DB 5200C. The number-of-passes specifying unit 5203 stores the calculated total number of passes in the number-of-passes information DB 5200F in association with the identification information of the vehicle 3 and the identification information on the digital signage apparatus 7 corresponding thereto.

When the number of passes is not registered in the number-of-passes information DB 5200F for a certain digital signage apparatus 7 and a certain vehicle 3, the number-of-passes specifying unit 5203 first calculates the number of passes. On the other hand, when the number of passes is registered in the number-of-passes information DB 5200F, the number-of-passes specifying unit 5203 regularly calculates the number of times (the number of passes to be added) the vehicle has passed through the vicinity of the digital signage apparatus 7 with respect to the unprocessed vehicle movement history of the vehicle 3. The number-of-passes specifying unit 5203 updates the number-of-passes information DB 5200F by adding the newly calculated number of times (the number of passes to be added) the vehicle has passed through the vicinity of the digital signage apparatus 7 to the number of passes that has already been registered.

The target digital signage information acquisition unit 5204 acquires information on the digital signage apparatus 7 that is a distribution target of a predetermined advertisements input (received) from a network such as an Internet network or from an input apparatus of the server computer, from the digital signage information DB 5200E. Specifically, the target digital signage information acquisition unit 5204 acquires the position information of the digital signage apparatus 7 that is a distribution target, information on a height at which the display unit is arranged, information on a positional relationship with an adjacent road, and the like from the digital signage information DB 5200E.

Information on a guidance destination (for example, a real store at which target products of the advertisement and the like are sold) desired for a user to be guided by the advertisement (guidance destination information), characteristics information of target users who are targets of the advertisement (user characteristics target information), information on a location that is a target of the advertisement (for example, a point of interest (POI) at which a large number of target users are gathered, an area close to the guidance destination to which the users are guided, and a road link through which the user directed to the guidance destination is likely to pass) (location target information), and the like are stored in the advertisement DB 5200G in association with the advertisement data, in addition to advertisement data (for example, an advertisement image) corresponding to input content of the advertisement. The digital signage apparatus 7 that is a distribution target may be determined comprehensively in consideration of the target information described above.

The target vehicle detector 5205 detects the vehicle 3 (the target vehicle) located in the vicinity of the digital signage apparatus 7 which is a distribution target of a predetermined advertisement from among the vehicles 3. For example, the target vehicle detector 5205 detects the target vehicle located in a predetermined range (a visually recognizable range) on a road on which the occupant can visually recognize the digital signage apparatus 7. Specifically, the target vehicle detector 5205 detects the target vehicle based on the latest position information of the respective vehicles 3 in the probe information DB 5200B or the vehicle movement history DB 5200C and the information on the digital signage apparatus 7 acquired by the target digital signage information acquisition unit 5204. The visually recognizable range of the digital signage apparatus 7 is, for example, an adaptive value that is appropriately set based on a positional relationship between the digital signage apparatus 7 and an adjacent road, the height at which the display unit of the digital signage apparatus 7 is installed, a direction in which the vehicle 3 moves, and the like.

The target vehicle detector 5205 may detect the vehicle 3 located in the visually recognizable range of the digital signage apparatus 7 using another method. For example, an aspect in which a sensor for detecting the vehicle 3, such as a camera, is mounted on the digital signage apparatus 7, and the target vehicle detector 5205 detects the vehicle 3 located in the visually recognizable range of the digital signage apparatus 7 based on output information of the sensor may be adopted. Specifically, an aspect in which a specific detection process is performed by the digital signage apparatus 7, and a detection result is transmitted from the digital signage apparatus 7 to the center server 5 may be adopted. Accordingly, the target vehicle detector 5205 can detect the vehicle 3 located in the visually recognizable range of the digital signage apparatus 7 according to the detection result from the digital signage apparatus 7 received by the communication processing unit 5201.

The visual recognition frequency information acquisition unit 5206 acquires information on the visual recognition frequency (visual recognition frequency information) of the digital signage apparatus 7 of the occupant getting on the target vehicle (the vehicle 3) detected by the target vehicle detector 5205. In the first embodiment, the visual recognition frequency information acquisition unit 5206 acquires, as the visual recognition frequency information, the total number of times the target vehicle passes through the vicinity of the digital signage apparatus 7 (the total number of passes) from the number-of-passes information DB 5200F. Details thereof will be described below.

The information distribution unit 5207 (an example of a display controller) transmits advertisement data to the digital signage apparatus 7 that is an advertisement distribution target via the communication processing unit 5201. As described above, the information distribution unit 5207 can display advertisement information (advertisement image) corresponding to advertisement data on the display unit of the digital signage apparatus 7. The information distribution unit 5207 changes the content of the advertisement information to be displayed on the digital signage apparatus 7 according to the visual recognition frequency information of the target vehicle acquired by the visual recognition frequency information acquisition unit 5206. Specifically, the information distribution unit 5207 transmits a command signal to the digital signage apparatus 7 via the communication processing unit 5201 to change the content of the advertisement information displayed on the digital signage apparatus 7. More specifically, the information distribution unit 5207 determines a visual recognition frequency of the information displayed on the display unit of the digital signage apparatus 7 of the occupant of the target vehicle based on the visual recognition frequency information acquired by the visual recognition frequency information acquisition unit 5206. The information distribution unit 5207 makes the content of the advertisement information different between a case where the visual recognition frequency of the occupant of the target vehicle is relatively high and a case where the visual recognition frequency of the occupant of the target vehicle is relatively low. In this case, for example, the information distribution unit 5207 distributes two pieces of advertisement data of the advertisement information corresponding to the case where the visual recognition frequency is relatively high and the case where the visual recognition frequency is relatively low to the digital signage apparatus 7 via the communication processing unit 5201 in advance. Accordingly, it is possible to provide different information to an occupant having a relatively high visual recognition frequency of the information on the digital signage apparatus 7. Therefore, it is possible to further curtail tiredness of the occupant and further improve effects of providing information through the digital signage apparatus 7.

Figures 4, 5:
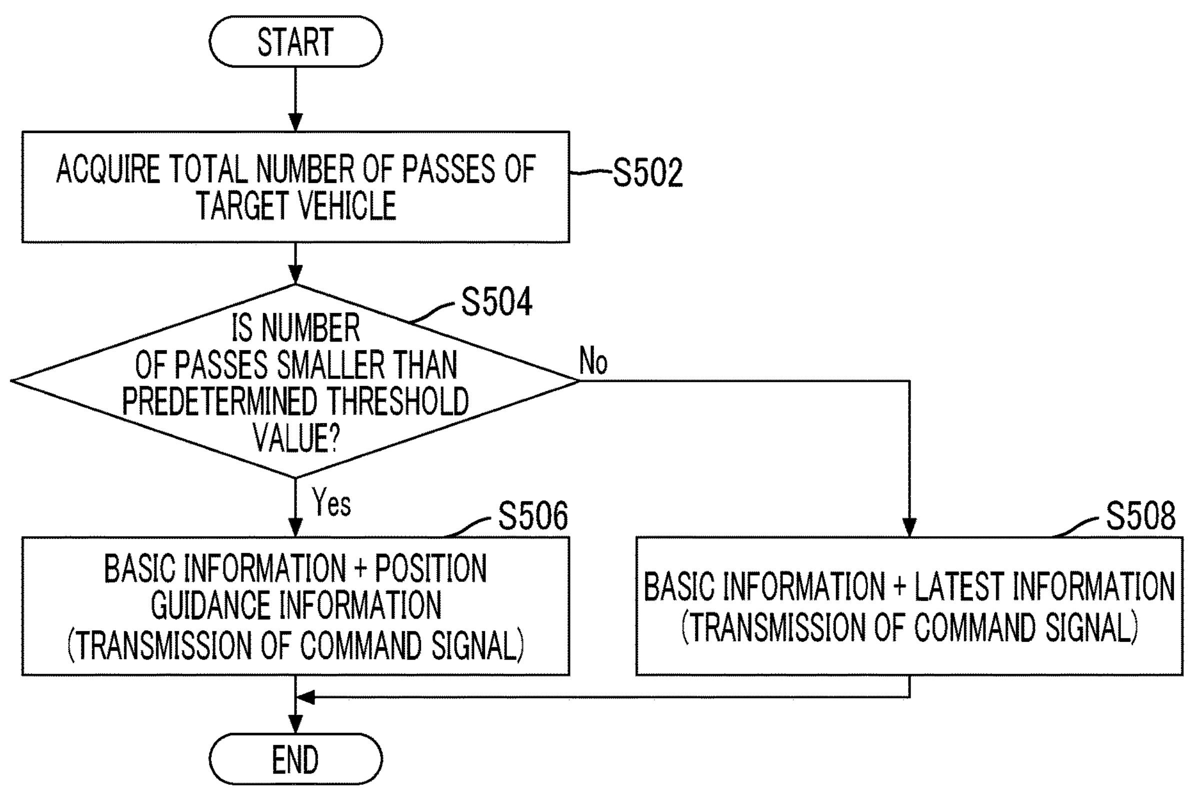
FIG. 4 is a diagram illustrating an example of a plurality of pieces of individual information constituting advertisement information.
FIG. 5 is a flowchart schematically illustrating an example of a process in the center server according to the first embodiment.

For example, FIG. 4 is a diagram illustrating an example of a plurality of pieces of individual information constituting the advertisement information. Specifically, FIG. 4 is a diagram illustrating a specific example of a plurality of pieces of detailed information that can be included in advertisement information on a certain store.

As illustrated in FIG. 4, a brand name of a store, a store name, position guidance information, handled product information, sale information, coupon information, and other information are defined as a plurality of pieces of individual information constituting the advertisement information on a certain store.

The brand name and the store name of the store are basic information indicating an advertisement object of the advertisement information.

The position guidance information is information for guiding information on the position of a store which is an advertisement object. The position guidance information may include, for example, address information corresponding to a position of the store which is an advertisement object, and route guidance information for guiding a route from the vicinity of the installation position of the digital signage apparatus 7 to the store.

The handled product information is an example of the detailed information related to the advertisement information (basic information) and is information on a type or brand of the product handled in the store that is the advertisement object.

The sale information and the coupon information are examples of new information that can be updated, that is, the latest information related to the advertisement information (the basic information). The sale information includes information on the sale being held at the store that is an advertisement object, such as a sale target product, a discount rate according to the sale, and a sale period. The coupon information includes information on an advertisement included in a web or a newspaper, or a coupon that can be acquired at a storefront or the like. For example, a method of acquiring the coupon, target products of a coupon, content of benefits according to the coupon, a period of application of the coupon, and the like are included.

Other information may include, for example, supplementary information for supplementing advertisement information (basic information), such as a telephone number of the store or a URL of a website.

For example, when the total number of times the target vehicle passes through the vicinity of the digital signage apparatus 7, as the visual recognition frequency information, is relatively small and, specifically, when the number of times is smaller than the predetermined threshold value, the information distribution unit 5207 displays the basic information and the position guidance information among a plurality of pieces of individual information that can be included in the advertisement information on the digital signage apparatus 7. This is because when the total number of passes of the target vehicle is relatively small, the occupant of the target vehicle is likely not to know the advertisement object (store) related to the advertisement information displayed on the digital signage apparatus 7, and therefore, it is needed to cause the advertisement object to be recognized using the basic information and the position guidance information. On the other hand, when the total number of times the target vehicle passes through the vicinity of the digital signage apparatus 7, as the visual recognition frequency information, is relatively large and, specifically, when the number of times is equal to or larger than the predetermined threshold value, the information distribution unit 5207 displays at least one of the basic information, the latest information, the detailed information, and the supplementary information among the plurality of pieces of individual information that can be included in the advertisement information on the digital signage apparatus 7. In this case, the information distribution unit 5207 does not have to display all the basic information as long as the occupant of the target vehicle can be caused to recognize a store that is an advertisement object. For example, an aspect in which the information distribution unit 5207 displays solely any of a brand name of the store and a name of the store may be adopted. This is because when the total number of passes of the target vehicle is relatively large, the occupant of the target vehicle is likely to have already known the basic information and the position guidance information on the advertisement object (store) related to the advertisement information displayed on the digital signage apparatus 7, and therefore, it is more effective to provide the detailed information, the latest information, the supplementary information, and the like.

An aspect in which the digital signage apparatus 7 executes an image processing process for changing the content of the advertisement information according to a command signal from the information distribution unit 5207 when the content of the advertisement information displayed on the digital signage apparatus 7 is changed may be adopted.

Details of Operation of Information Distribution System

A specific operation of the information distribution system 1 according to the first embodiment will be described with reference to FIG. 5.

FIG. 5 is a flowchart schematically illustrating an example of a process in the processing apparatus 52 of the center server 5 according to the first embodiment.

The process according to this flowchart is executed for each digital signage apparatus 7 which is a distribution target of a predetermined advertisement among the digital signage apparatuses 7. The process according to the flowchart is started when the vehicle 3 is detected in a visually recognizable range of the digital signage apparatus 7 that is a distribution target of a predetermined advertisement by the target vehicle detector 5205, and is repeatedly executed until the vehicle 3 is not detected. When the vehicles 3 are detected by the target vehicle detector 5205, the process according to the flowchart may be executed with respect to the vehicle 3 closest to the digital signage apparatus 7 among the detected vehicles 3. The same applies to the flowcharts of FIGS. 8, 12, and 14.

In step S502, the visual recognition frequency information acquisition unit 5206 acquires the total number of times the target vehicle has passed through the vicinity of the digital signage apparatus 7 from the number-of-passes information DB 5200F.

In step S504, the information distribution unit 5207 determines whether or not the total number of times the target vehicle has passed through the vicinity of the digital signage apparatus 7 is smaller than a predetermined threshold value. The information distribution unit 5207 proceeds to step S506 when the total number of passes is smaller than the predetermined threshold value, and to step S508 when the total number of passes is equal to or greater than the predetermined threshold value.

In step S506, the information distribution unit 5207 transmits a command signal for displaying advertisement information including basic information and position guidance information to the digital signage apparatus 7 via the communication processing unit 5201. Accordingly, it is possible to cause the occupant of the target vehicle in which the visual recognition frequency of the digital signage apparatus 7 is likely to be relatively low, to recognize the basic information and the position guidance information regarding the advertisement object related to the advertisement information, as described above.

Meanwhile, in step S508, the information distribution unit 5207 transmits a command signal for displaying advertisement information including basic information and latest information to the digital signage apparatus 7 via the communication processing unit 5201. Accordingly, it is possible to provide the latest information that can be updated to the occupant of the target vehicle in which the visual recognition frequency of the digital signage apparatus 7 is likely to be relatively high, further curtail tiredness of the occupant, and further improve effects of advertisement distribution, as described above.

Operation

As described above, in the first embodiment, the information distribution unit 5207 changes the content of the information to be displayed on the digital signage apparatus 7 according to the visual recognition frequency information on the frequency at which the occupant of the target vehicle visually recognizes the digital signage apparatus 7.

As described above, the center server 5 can change the content of the information to be displayed on the digital signage apparatus 7 in consideration of the frequency at which the occupant of the target vehicle detected in the vicinity of the digital signage apparatus 7 visually recognizes the information on the digital signage apparatus 7 based on the visual recognition frequency information. Accordingly, the center server 5 can display information different from normally displayed information, for example, to the occupant frequently passing through the vicinity of the digital signage apparatus 7 by the vehicle 3 and having a relatively high visual recognition frequency of information on the digital signage apparatus 7. Therefore, it is possible to further curtail tiredness of the occupant having a relatively high visual recognition frequency of the information on the digital signage apparatus 7, and further improve effects of providing the information through the digital signage apparatus 7.

In the first embodiment, the vehicle movement information accumulation processing unit 5202 collects the vehicle movement information including the position information from the vehicles 3 including the target vehicle, and stores the vehicle movement information as the vehicle movement history (trip information) in the vehicle movement history DB 5200C. The visual recognition frequency information acquisition unit 5206 acquires the number of times the target vehicle has passed through the vicinity of the digital signage apparatus 7, which is calculated based on the vehicle movement history by the number-of-passes specifying unit 5203 as the visual recognition frequency information. The information distribution unit 5207 changes the content of the information to be displayed on the digital signage apparatus 7 according to the number of passes acquired by the visual recognition frequency information acquisition unit 5206.

As described above, the center server 5 can acquire the number of times the target vehicle has passed through the vicinity of the digital signage apparatus 7 based on the vehicle movement history information of the target vehicle detected in the vicinity of the digital signage apparatus 7. Accordingly, the center server 5 can change the content of the information to be displayed on the digital signage apparatus 7 specifically in consideration of the visual recognition frequency of the digital signage apparatus 7 of the occupant of the target vehicle based on the number of times the target vehicle has passed through the vicinity of the digital signage apparatus 7.

In the first embodiment, when the number of passes acquired by the visual recognition frequency information acquisition unit 5206 is relatively small, the information distribution unit 5207 displays basic information related to a predetermined target and position guidance information of the place related to the target. On the other hand, when the number of passes acquired by the visual recognition frequency information acquisition unit 5206 is relatively large, the information distribution unit 5207 displays at least one of the basic information, the detailed information, the supplementary information, and the latest information related to the target on the digital signage apparatus 7.

As described above, the center server 5 can provide, for example, position guidance information of the place related to the target, in addition to the basic information on a predetermined target such as a product or a store to the occupant having a relatively low visual recognition frequency of the digital signage apparatus 7. Therefore, the center server 5 can cause the occupant having the relatively low visual recognition frequency of the digital signage apparatus 7 to recognize the basic information related to the target, such as an information target and a place related to the target. On the other hand, the center server 5 can provide the detailed information, the supplementary information, the latest information, and the like in addition to the basic information to the occupant having a relatively high visual recognition frequency of the digital signage apparatus 7. Accordingly, specifically, it is possible to further curtail tiredness of the occupant having a relatively high visual recognition frequency of the digital signage apparatus 7, and further improve effects of providing information through the digital signage apparatus 7.

In the first embodiment, the center server 5 may select different advertisement information from among a plurality of pieces of advertisement information having different advertisement objects instead of changing the combination of the individual information constituting the advertisement information on the same advertisement object to thereby change the content of the information to be displayed on the digital signage apparatus 7. The same also applies to the second to fourth embodiments. In this case, for example, a plurality of pieces of candidate information is predefined, and a priority is predefined for each of the pieces of candidate information. When the number of passes acquired by the visual recognition frequency information acquisition unit 5206 is relatively small, the information distribution unit 5207 may display candidate information having a relatively high priority among the pieces of candidate information on the digital signage apparatus 7. When the number of passes acquired by the visual recognition frequency information acquisition unit 5206 is relatively large, the information distribution unit 5207 may display the candidate information having a relatively low priority among the pieces of candidate information on the digital signage apparatus 7.

Accordingly, since the center server 5 provides information with a relatively high priority to the occupant of which the visual recognition frequency of the digital signage apparatus 7 is relatively low, it is possible to cause the advertisement information having a relatively high priority to be visually recognized by more occupants. Since the center server 5 provides information with a relatively low priority to the occupant having a relatively high visual recognition frequency of the digital signage apparatus 7, it is possible to further curtail tiredness of the occupant and, specifically, to further improve effects of information provision through the digital signage apparatus 7.

Second Embodiment

A second embodiment will be described.

An information distribution system 1 according to the second embodiment is different from that according to the first embodiment in that the number of passes in a situation in which the occupant of the target vehicle can grasp the content of the digital signage apparatus 7 among a total number of times the target vehicle has passed through the vicinity of the digital signage apparatus 7 is used. Specifically, the information distribution system 1 according to the second embodiment is different from that according to the first embodiment in that a visual recognition determination unit 5208 and a weather information DB 5200H are added in the processing apparatus 52 of the center server 5. Hereinafter, configurations that are the same as or correspond to those of the first embodiment are denoted by the same reference numerals, and parts different from those in the first embodiment will be mainly described.

Configuration of Information Distribution System

A configuration of the information distribution system 1 according to the second embodiment will be described with reference to FIG. 6.

Figure 6:
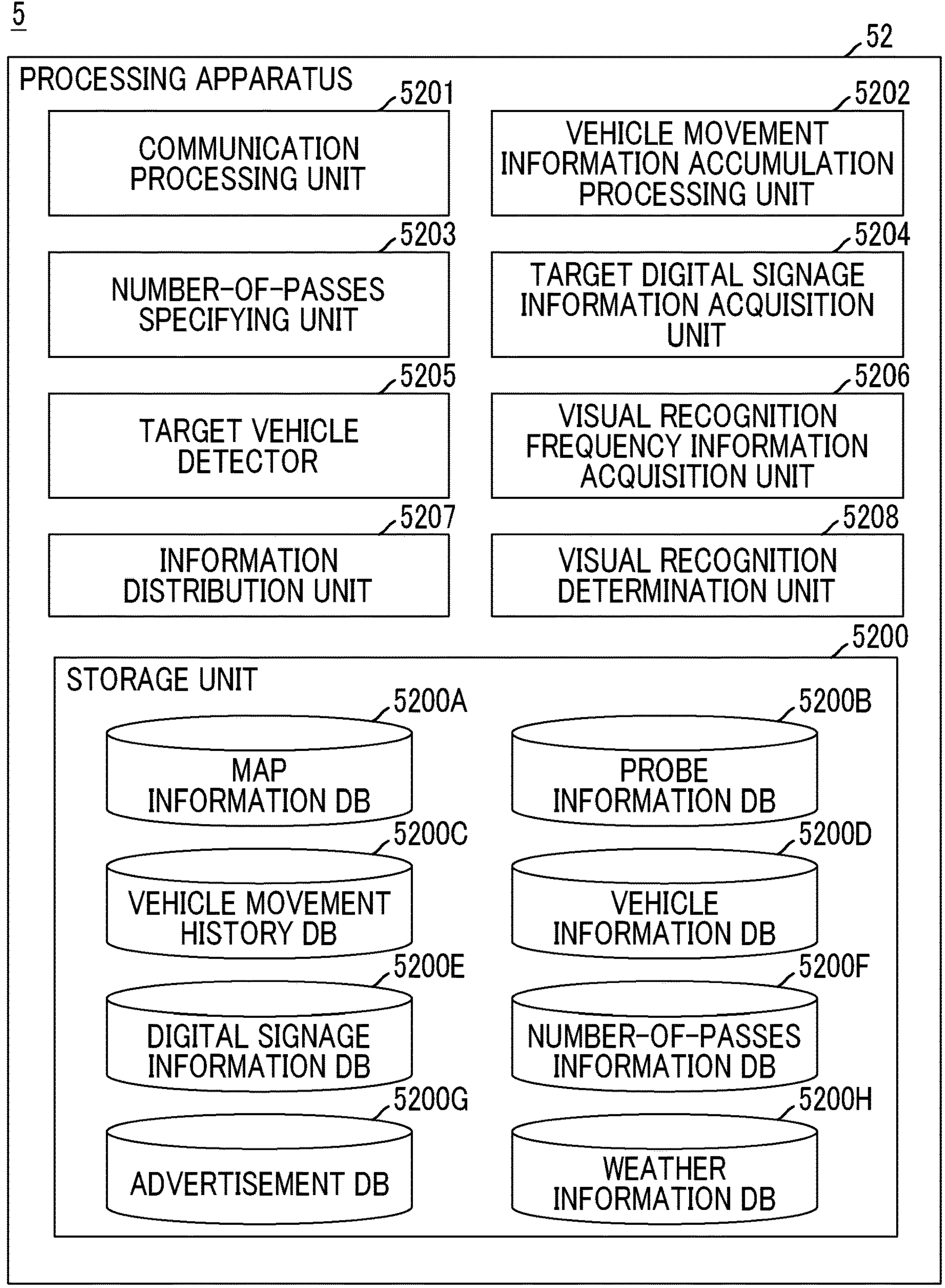
FIG. 6 is a functional block diagram illustrating an example of a functional configuration of a center server according to a second embodiment.

FIG. 6 is a diagram illustrating an example of a functional configuration of a center server 5 according to the second embodiment.

Figure 2:
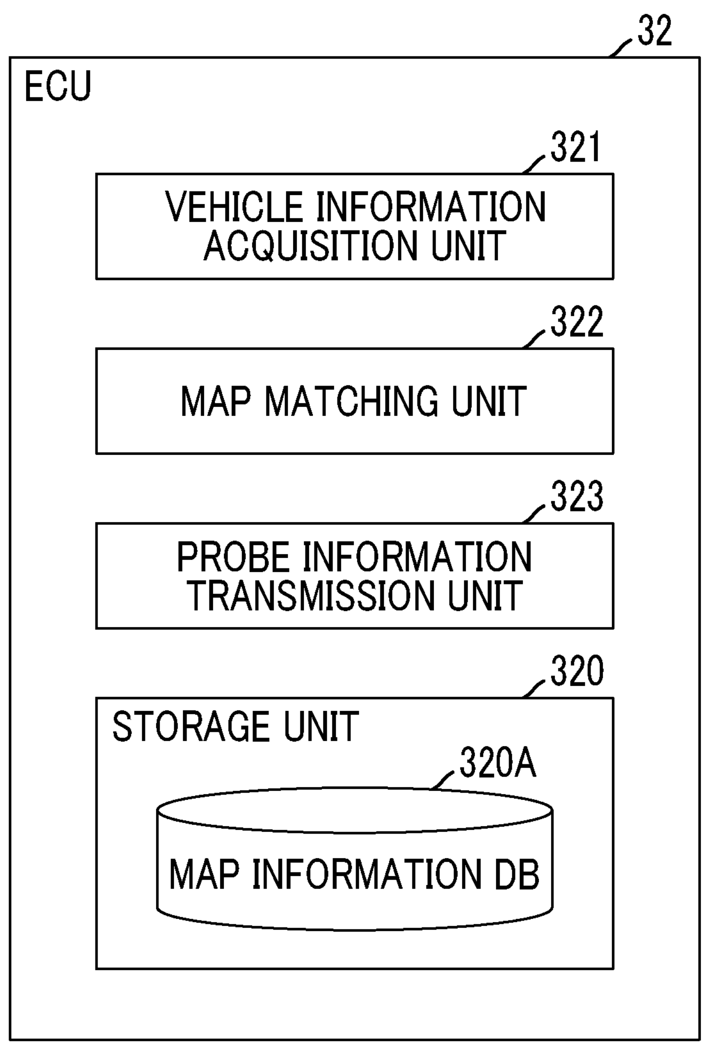
FIG. 2 is a functional block diagram schematically illustrating an example of a functional configuration of a vehicle according to the first embodiment.
Figure 3:
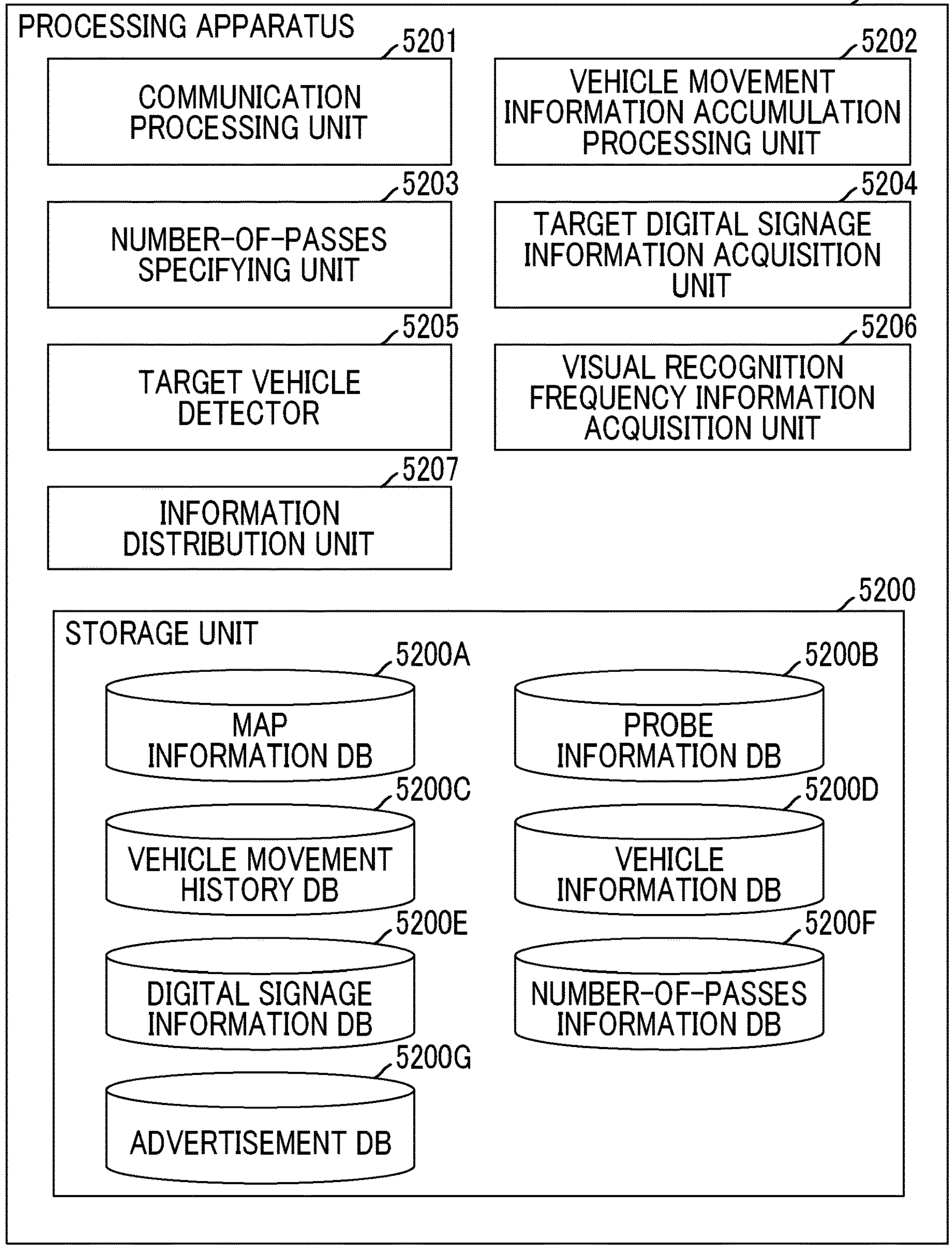
FIG. 3 is a functional block diagram schematically illustrating an example of a functional configuration of a center server according to the first embodiment.

A configuration of the information distribution system 1 and a functional configuration of the vehicle 3 according to the second embodiment are shown by FIGS. 1 and 2, as in the first embodiment.

The center server 5 includes a communication apparatus 51 and a processing apparatus 52, as in the first embodiment.

The processing apparatus 52 includes a communication processing unit 5201, a vehicle movement information accumulation processing unit 5202, a number-of-passes specifying unit 5203, a target digital signage information acquisition unit 5204, a target vehicle detector 5205, a visual recognition frequency information acquisition unit 5206, an information distribution unit 5207, and a visual recognition determination unit 5208 as functional units that are realized by executing one or more programs stored in the ROM or the auxiliary storage device on the CPU. The processing apparatus 52 includes, for example, a storage unit 5200 as a storage area defined in an auxiliary storage device of the server computer or an external storage device connected to the server computer. In the storage unit 5200, the map information DB 5200A, the probe information DB 5200B, the vehicle movement history DB 5200C, the vehicle information DB 5200D, the digital signage information DB 5200E, the number-of-passes information DB 5200F, the advertisement DB 5200G and the weather information DB 5200H are stored.

The visual recognition determination unit 5208 determines whether or not the occupant getting on the vehicle 3 is in a situation in which the occupant can grasp the content of the digital signage apparatus 7 when the vehicle 3 has passed through the vicinity of the digital signage apparatus 7. Specifically, the visual recognition determination unit 5208 determines whether or not visual recognition is possible each time the number-of-passes specifying unit 5203 has determined that the vehicle 3 has passed through the vicinity of the digital signage apparatus 7 with respect to a certain digital signage apparatus 7 and a certain vehicle 3.

For example, the visual recognition determination unit 5208 may perform the visual recognition determination based on the vehicle speed information of the vehicle 3 when the vehicle 3 passes through the vicinity of the digital signage apparatus 7. In this case, the visual recognition determination unit 5208 can refer to the vehicle speed information of the vehicle 3 stored in the probe information DB 5200B. This is because when the vehicle speed of the vehicle 3 becomes relatively high, a higher dynamic visual acuity is needed in order to visually recognize the information displayed on the digital signage apparatus 7, and therefore, it becomes difficult for the occupant to grasp the content displayed on the digital signage apparatus 7. Specifically, in a case where the vehicle speed of the vehicle 3 is equal to or higher than a predetermined speed when the vehicle 3 passes through the vicinity of the digital signage apparatus 7, the visual recognition determination unit 5208 may determine that the occupant getting on the vehicle 3 is in a situation in which the occupant cannot grasp the content of the digital signage apparatus 7.

For example, when the vehicle 3 passes through the vicinity of the digital signage apparatus 7, the visual recognition determination unit 5208 may perform the visual recognition determination based on whether or not the digital signage apparatus 7 is in a backlit state when the digital signage apparatus 7 is viewed from the vehicle 3. In this case, the visual recognition determination unit 5208 can refer to the positional relationship between the vehicle 3 and the display unit of the digital signage apparatus 7 based on the vehicle movement history DB 5200C and the digital signage information DB 5200E. The visual recognition determination unit 5208 can refer to weather situation when the vehicle 3 passes through the vicinity of the digital signage apparatus 7, an azimuth angle of the sun at that time, and the like based on the weather information DB 5200H. This is because when the digital signage apparatus 7 is in the backlit state when the digital signage apparatus 7 is viewed from the occupant of the vehicle 3, it becomes difficult for the occupant to view the content displayed on the digital signage apparatus 7. Specifically, when the vehicle 3 passes through the vicinity of the digital signage apparatus 7, the visual recognition determination unit 5208 determines whether or not the digital signage apparatus 7 is in the backlit state when the digital signage apparatus 7 is viewed from the vehicle 3. When the digital signage apparatus 7 is in the backlit state, the visual recognition determination unit 5208 may determine that the occupant getting on the vehicle 3 is in a situation in which the occupant cannot grasp the content of the digital signage apparatus 7.

For example, when the vehicle 3 passes through the vicinity of the digital signage apparatus 7, the visual recognition determination unit 5208 may perform the visual recognition determination based on whether or not weather is bad in the vicinity of the digital signage apparatus 7. In this case, the visual recognition determination unit 5208 can refer to weather when the vehicle 3 passes through the vicinity of the digital signage apparatus 7 based on the weather information DB 5200H. The bad weather may include fog, heavy rain (rain of which the amount per unit time is equal to or larger than a predetermined amount), heavy snow (snow of which the amount of snowfall per unit time is equal to or larger than a predetermined amount), hail, hailstone, the like. This is because when weather is bad in the vicinity of the digital signage apparatus 7, it becomes difficult for the content of the digital signage apparatus 7 to be viewed from the occupant of the vehicle 3 due to a poor field of vision. Specifically, the visual recognition determination unit 5208 confirms weather in the vicinity of the digital signage apparatus 7 when the vehicle 3 passes through the vicinity of the digital signage apparatus 7. In the case of the bad weather, the visual recognition determination unit 5208 may determine that the occupant getting on the vehicle 3 is in a situation in which the occupant cannot grasp the content of the digital signage apparatus 7.

The center server 5 can be connected to, for example, an external weather information server or the like over a predetermined communication network including an Internet network, and the weather information DB 5200H can be appropriately updated with information acquired from the weather information server or the like.

The number-of-passes specifying unit 5203 calculates, for the respective digital signage apparatuses 7, the total number of times the respective vehicles 3 have passed through the vicinity of the digital signage apparatus 7 (total number of passes), as in the first embodiment. The number-of-passes specifying unit 5203 calculates the number of passes in a situation in which the occupant getting on the vehicle 3 can grasp the content of the digital signage apparatus 7 (the number of visually recognizable passes) in the total number of times the respective vehicles 3 pass through the vicinity of the digital signage apparatus 7. That is, the number-of-passes specifying unit 5203 calculates the number of visually recognizable passes that is the number of times the vehicle 3 has passed through the vicinity of the digital signage apparatus 7 in a situation in which a result of the determination in the visual recognition determination unit 5208 is a positive determination in the total number of times the vehicle 3 has passed through the vicinity of the digital signage apparatus 7. The number-of-passes specifying unit 5203 stores the calculated total number of passes and the number of visually recognizable passes in the number-of-passes information DB 5200F in association with the identification information of the vehicle 3 and the identification information on the digital signage apparatus 7 corresponding thereto.

The visual recognition frequency information acquisition unit 5206 acquires the number of visually recognizable passes as the visual recognition frequency information regarding the digital signage apparatus 7 of the occupant getting on the target vehicle detected by the target vehicle detector 5205, unlike the first embodiment.

The information distribution unit 5207 changes the content of the advertisement information to be displayed on the digital signage apparatus 7 based on the number of visually recognizable passes of the target vehicle, which is acquired by the visual recognition frequency information acquisition unit 5206, unlike the first embodiment.

For example, the information distribution unit 5207 displays the basic information and the position guidance information among a plurality of pieces of individual information that can be included in the advertisement information on the digital signage apparatus 7 when the number of visually recognizable passes of the target vehicle is relatively small with respect to a certain digital signage apparatus 7, specifically, when the number of visually recognizable passes is smaller than a predetermined threshold value. On the other hand, the information distribution unit 5207 displays at least one of the basic information, the latest information, the detailed information, and the supplementary information among the pieces of individual information that can be included in the advertisement information on the digital signage apparatus 7 when the number of visually recognizable passes of the target vehicle is relatively large, specifically, when the number of visually recognizable passes is equal to or larger than the predetermined threshold value.

Since the specific operation of the information distribution system 1 according to the second embodiment is realized by the same process as in FIG. 5 of the first embodiment, that is, is realized by replacing the "total number of passes" with the "number of visually recognizable passes" in the process in FIG. 5, detailed description thereof will be omitted.

Operation

As described above, in the second embodiment, the visual recognition determination unit 5208 determines whether or not the occupant getting on the target vehicle is in a situation in which the occupant can grasp the content of the digital signage apparatus 7 when the target vehicle has passed through the vicinity of the digital signage apparatus 7. The visual recognition frequency information acquisition unit 5206 acquires the number of times the target vehicle has passed through the vicinity of the digital signage apparatus 7 in a situation in which a determination result of the visual recognition determination unit 5208 corresponds to a positive determination (the number of visually recognizable passes) in the total number of times the target vehicle has passed the vicinity of the digital signage apparatus 7 (the total number of passes).

Accordingly, the center server 5 can acquire the number of passes corresponding to the number of times the occupant has actually visually recognized the information on the digital signage apparatus 7 while excluding the number of passes in a situation in which the occupant is likely not to be able to visually recognize the digital signage apparatus 7 from the total number of passes.

In the second embodiment, when the target vehicle passes through the vicinity of the digital signage apparatus 7, the visual recognition determination unit 5208 determines that the occupant getting on the target vehicle is in a situation in which the occupant cannot grasp the content of the digital signage apparatus 7 in a case where a vehicle speed of the target vehicle is equal to or higher than a predetermined speed, a case where the digital signage apparatus 7 is in a backlit state when the digital signage apparatus 7 is viewed from the occupant getting on the target vehicle, or a case where the digital signage apparatus 7 is under a predetermined bad weather.

As described above, the center server 5 can specifically determine a case of a relatively high vehicle speed, a case of a backlit state, or a case of bad weather not to be a situation in which the content of the digital signage apparatus 7 can be recognized.

Accordingly, the center server 5 can acquire the number of passes corresponding to the number of times the occupant has actually visually recognized the information on the digital signage apparatus 7 while excluding the number of passes in a situation in which the occupant is likely not to be able to visually recognize the digital signage apparatus 7 from the total number of passes.

In the second embodiment, when the target vehicle passes through the vicinity of the digital signage apparatus 7, the visual recognition determination unit 5208 determines that the occupant getting on the target vehicle is in a situation in which the occupant cannot grasp the content of the digital signage apparatus 7 in a case where a vehicle speed of the target vehicle is equal to or higher than a predetermined speed, a case where the digital signage apparatus 7 is in a backlit state when the digital signage apparatus 7 is viewed from the occupant getting on the target vehicle, or a case where the digital signage apparatus 7 is under a predetermined bad weather.

As described above, the center server 5 can specifically determine a case of a relatively high vehicle speed, a case of a backlit state, or a case of bad weather not to be a situation in which the content of the digital signage apparatus 7 can be recognized.

Third Embodiment

A third embodiment will be described.

An information distribution system 1 according to the third embodiment is different from that according to the first embodiment in that information on a residential place (residential place information) of an owner of the target vehicle is used as the visual recognition frequency information regarding the digital signage apparatus 7 of the occupant getting on the target vehicle. Specifically, the information distribution system 1 according to the third embodiment is different from that according to the first embodiment in that the number-of-passes specifying unit 5203 and the number-of-passes information DB 5200F are omitted in the processing apparatus 52 of the center server 5. Hereinafter, configurations that are the same as or correspond to those of the first embodiment are denoted by the same reference numerals, and parts different from those in the first embodiment will be mainly described.

Configuration of Information Distribution System

First, a configuration of the information distribution system 1 according to the third embodiment will be described with reference to FIG. 7.

Figure 7:
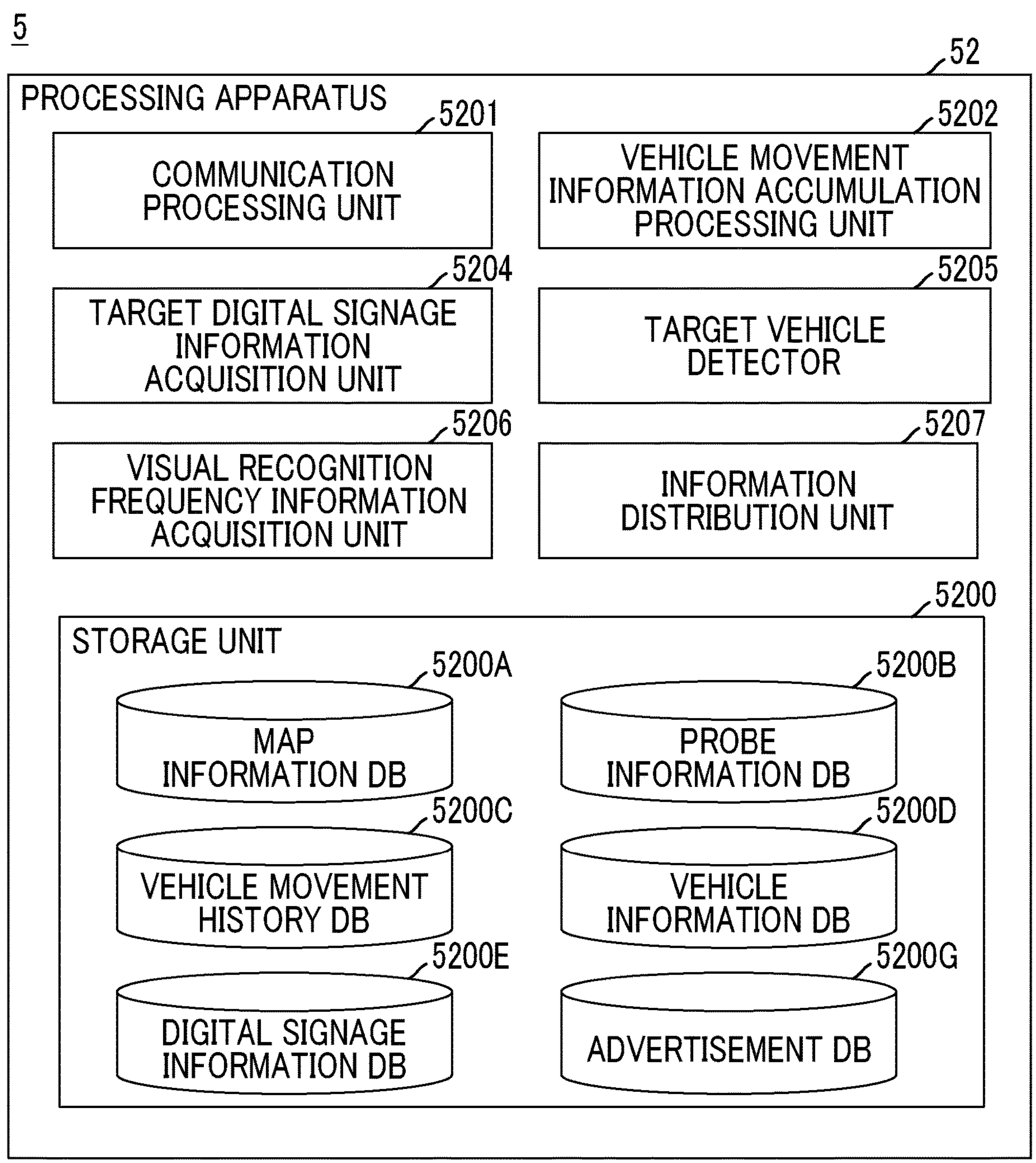
FIG. 7 is a functional block diagram illustrating an example of a functional configuration of a center server according to a third embodiment.

FIG. 7 is a functional block diagram illustrating an example of a functional configuration of a center server 5 according to the third embodiment.

An overall configuration of the information distribution system 1 and the functional configuration of the vehicle 3 according to the third embodiment are shown by FIGS. 1 and 2, as in the first embodiment.

The center server 5 includes a communication apparatus 51 and a processing apparatus 52, as in the first embodiment.

The processing apparatus 52 includes, for example, a communication processing unit 5201, a vehicle movement information accumulation processing unit 5202, a target digital signage information acquisition unit 5204, a target vehicle detector 5205, a visual recognition frequency information acquisition unit 5206, and an information distribution unit 5207 as functional units that are realized by executing one or more programs stored in the ROM or the auxiliary storage device on the CPU. The processing apparatus 52 includes, for example, a storage unit 5200 as a storage area defined in an auxiliary storage device of the server computer or an external storage device connected to the server computer. In the storage unit 5200, a map information DB 5200A, a probe information DB 5200B, a vehicle movement history DB 5200C, a vehicle information DB 5200D, a digital signage information DB 5200E, and an advertisement DB 5200G are stored.

The visual recognition frequency information acquisition unit 5206 acquires residential place information of the owner of the target vehicle as the visual recognition frequency information regarding the digital signage apparatus 7 of the occupant getting on the target vehicle (vehicle 3) based on the vehicle information DB 5200D, unlike the first embodiment.

In the vehicle information DB 5200D, residential place information such as address information of the owner of each vehicle 3 is registered in association with identification information of the respective vehicles 3 in advance.

The information distribution unit 5207 changes the content of the advertisement information to be displayed on the digital signage apparatus 7 based on the residential place information of the owner of the target vehicle, which is acquired by the visual recognition frequency information acquisition unit 5206, unlike the first embodiment.

For example, when the residential place of the owner of the target vehicle is not included in a predetermined area including the installation position of the digital signage apparatus 7, the information distribution unit 5207 displays the basic information and the position guidance information among a plurality of pieces of individual information that can be included in the advertisement information on the digital signage apparatus 7. The area may be appropriately defined as, for example, a range of limits in which a person is assumed to daily move using a private vehicle. When the owner of the target vehicle in the vicinity of the installation position of the digital signage apparatus 7 does not reside in the predetermined area including the installation position of the digital signage apparatus 7, it can be considered that the target vehicle comes from a certain distant side and the frequency at which the occupant of the target vehicle visually recognizes the digital signage apparatus 7 is relatively low. Therefore, it is possible to cause the occupant of the target vehicle considered to have a relatively low visual recognition frequency of the digital signage apparatus 7 to recognize the advertisement object by providing the basic information on the advertisement information, the position guidance information, and the like to the occupant. On the other hand, when the residential place of the owner of the target vehicle is included in the predetermined area including the installation position of the digital signage apparatus 7, the information distribution unit 5207 displays at least one of the basic information, the latest information, the detailed information, and the supplementary information among a plurality of pieces of individual information that can be included in the advertisement information on the digital signage apparatus 7. In this case, the information distribution unit 5207 does not have to display all the basic information as long as the occupant of the target vehicle can be caused to recognize a store that is an advertisement object. For example, the information distribution unit 5207 may display solely any of a brand name of the store and a name of the store. When the owner of the target vehicle lives in the predetermined area including the installation position of the digital signage apparatus 7, it can be considered that the target vehicle is likely to pass through the vicinity of the digital signage apparatus 7 in the past, and the frequency at which the occupant of the target vehicle visually recognizes the digital signage apparatus 7 is relatively high. Therefore, by providing the latest information, the detailed information, the supplementary information, and the like on the advertisement information to the occupant of the target vehicle considered to have a relatively high visual recognition frequency of the digital signage apparatus 7, it is possible to further curtail tiredness of the occupant and to further improve effects of information provision.

Details of Operation of Information Distribution System

A specific operation of the information distribution system 1 according to the third embodiment will be described with reference to FIG. 8.

Figure 8:
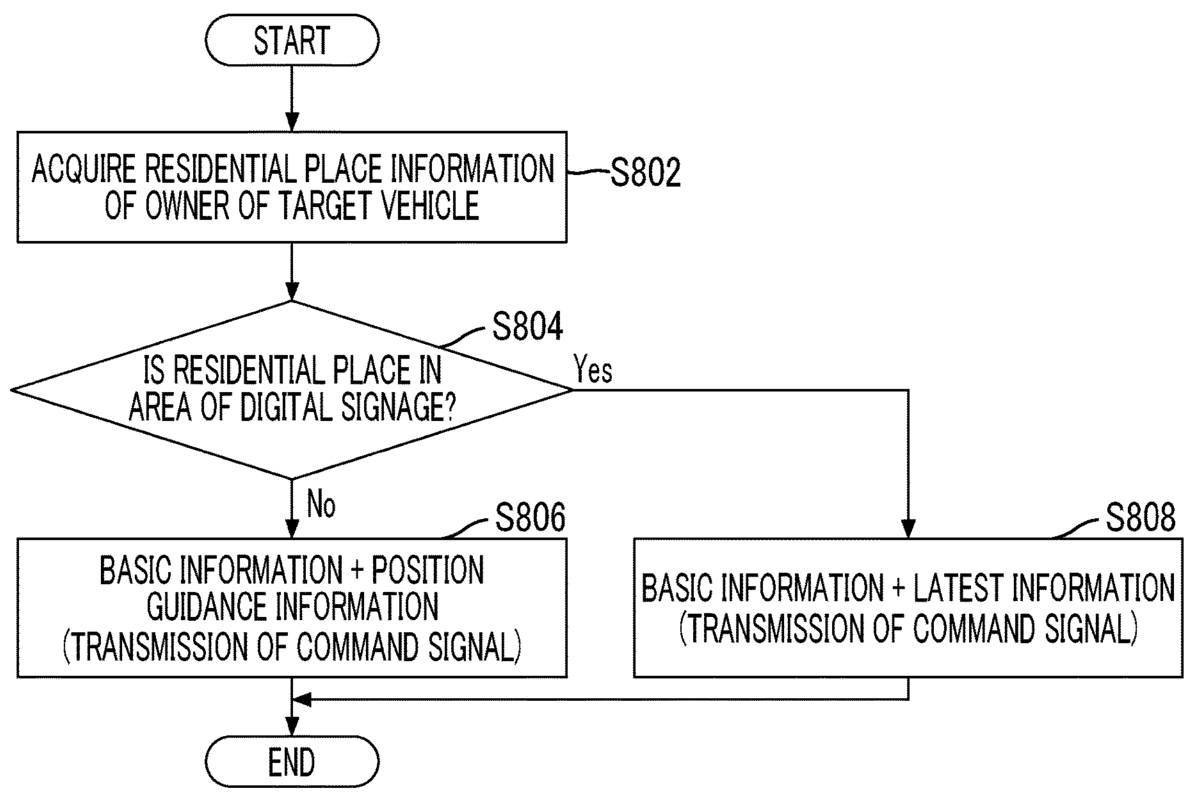
FIG. 8 is a flowchart schematically illustrating an example of a process in the center server according to the third embodiment.

FIG. 8 is a flowchart schematically illustrating an example of a process in the processing apparatus 52 of the center server 5 according to the third embodiment.

In step S802, the visual recognition frequency information acquisition unit 5206 acquires the residential place information of the owner of the target vehicle from the vehicle information DB 5200D.

In step S804, the information distribution unit 5207 determines whether or not the residential place of the owner of the target vehicle is included in the predetermined area including the installation position of the digital signage apparatus 7. The information distribution unit 5207 proceeds to step S806 when the owner of the target vehicle is not in the area and to step S808 when the owner of the target vehicle is in the area.

Since steps S806 and S808 are the same as steps S506 and S508 in FIG. 5 of the first embodiment, description thereof will be omitted.

Operation

As described above, in the third embodiment, the visual recognition frequency information acquisition unit 5206 acquires attribute information (residential place information) on whether or not the owner of the target vehicle is a resident in the predetermined area including the installation position of the digital signage, as the visual recognition frequency information on the frequency at which the occupant of the target vehicle visually recognizes the digital signage apparatus 7. The information distribution unit 5207 makes the content of information to be displayed on the digital signage different between a case where the owner of the target vehicle is the resident in the area and the case where the owner of the target vehicle is not the resident in the area, based on the residential place information.

As described above, when the owner of the target vehicle is the resident in the predetermined area including the installation position of the digital signage apparatus 7, that is, when the owner of the target vehicle is a local resident, the center server 5 can determine that the visual recognition frequency is relatively high. On the other hand, when the owner of the vehicle or the occupant is not the resident in the area, that is, when the occupant is a tourist or the like coming from another area, the center server 5 can determine that the visual recognition frequency of the digital signage apparatus 7 is relatively low. Therefore, the center server 5 can specifically make the content to be displayed on the digital signage apparatus 7 different between a case where the owner or the occupant of the target vehicle is the resident in the area and a case where the owner or the occupant of the target vehicle is not the resident in the area in consideration of the visual recognition frequency of the digital signage apparatus 7 of the occupant of the target vehicle.

Fourth Embodiment

A fourth embodiment will be described.

An information distribution system 1 according to the fourth embodiment is different from that according to the first embodiment in that the number of times a target occupant (an occupant who gets on a target vehicle) passed through the digital signage apparatus 7 in the past while in the vehicle is used as the visual recognition frequency information. Specifically, the information distribution system 1 according to the fourth embodiment is different from that according to the first embodiment in that a mobile terminal 4 carried by a user including an owner of the vehicle 3 is included. The information distribution system 1 according to the fourth embodiment is different from that according to the first embodiment in that a terminal movement information accumulation processing unit 5209, a getting-on vehicle extraction unit 5210, a usage vehicle specifying unit 5211, and a vehicle getting-on specifying unit 5212 are added in the processing apparatus 52 of the center server 5. Hereinafter, configurations that are the same as or correspond to those of the first embodiment are denoted by the same reference numerals, and parts different from those in the first embodiment will be mainly described.

Configuration of Information Distribution System

Figure 10:
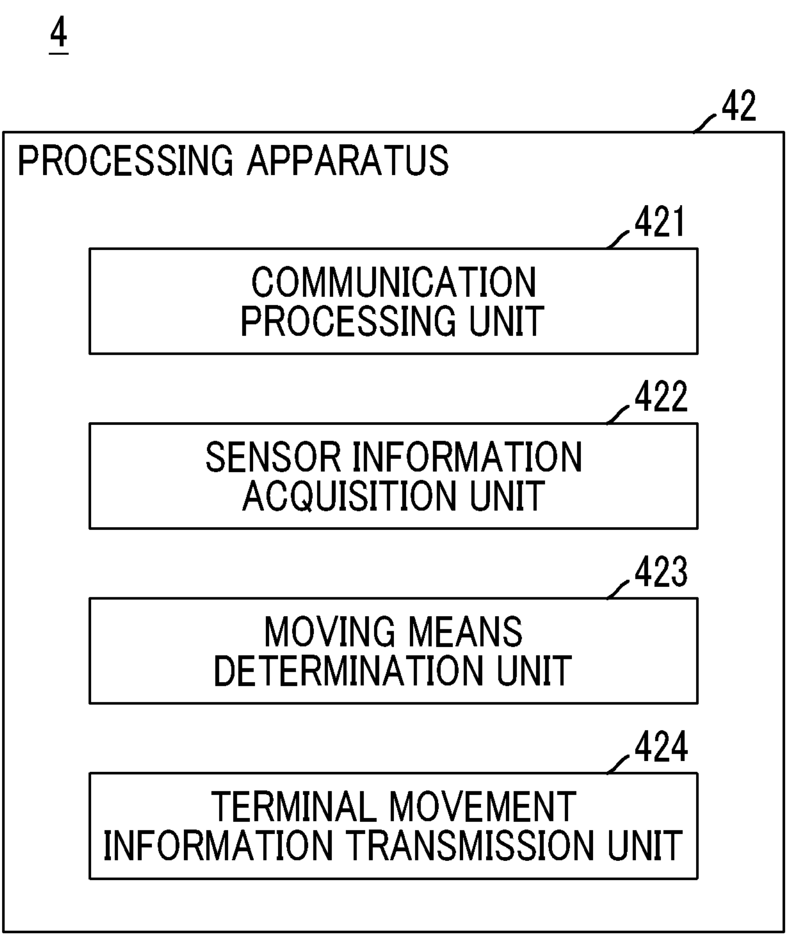
FIG. 10 is a functional block diagram schematically illustrating an example of a functional configuration of a mobile terminal according to the fourth embodiment.
Figure 11:
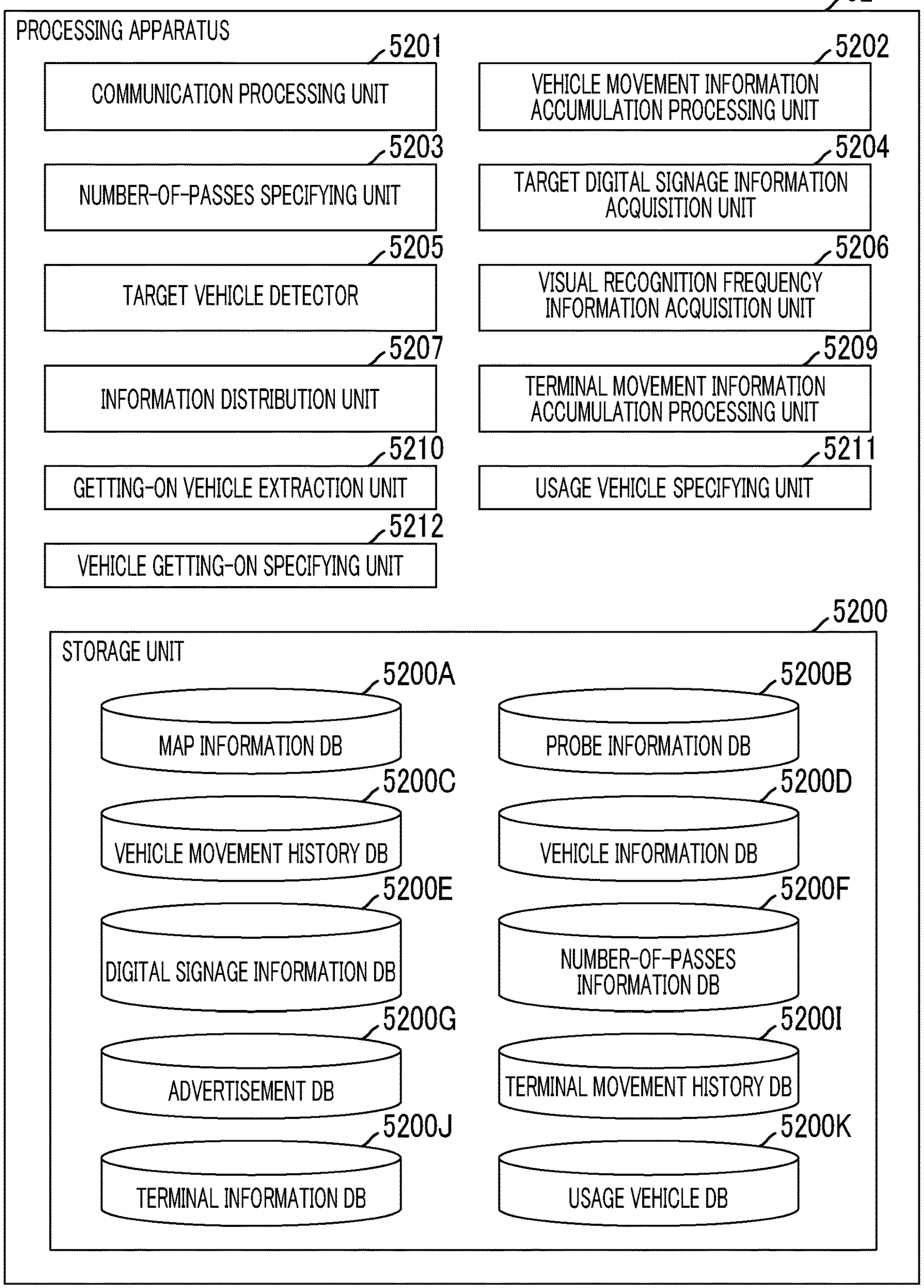
FIG. 11 is a functional block diagram schematically illustrating an example of a functional configuration of a center server according to the fourth embodiment.

First, a configuration of the information distribution system 1 according to the fourth embodiment will be described with reference to FIGS. 9 to 11.

Figure 9:
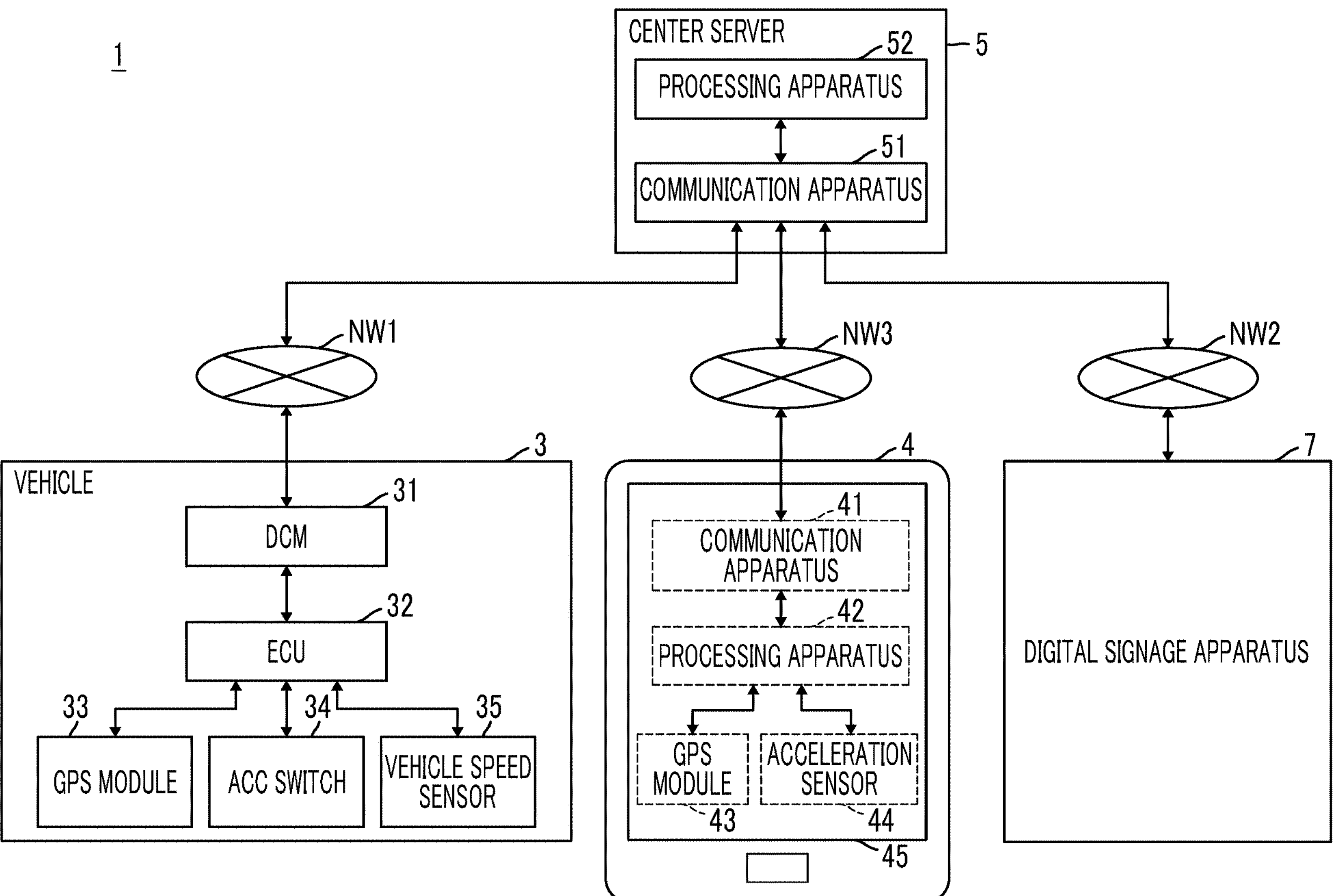
FIG. 9 is a diagram schematically illustrating an example of a configuration of an information distribution system according to a fourth embodiment.

FIG. 9 schematically shows the configuration of the information distribution system 1 according to the fourth embodiment. FIG. 10 is a functional block diagram schematically illustrating an example of a functional configuration of the mobile terminal 4 according to the fourth embodiment. FIG. 11 is a functional block diagram schematically illustrating an example of a functional configuration of the center server 5 according to the fourth embodiment.

The functional configuration of the vehicle 3 according to the fourth embodiment is illustrated in FIG. 2, as in the first embodiment.

The information distribution system 1 according to the fourth embodiment includes a plurality of vehicles 3, a plurality of mobile terminals 4, a plurality of digital signage apparatuses 7, a plurality of vehicles 3, a plurality of mobile terminals 4 carried by respective users including owners of the vehicles 3, and a center server 5 communicatively connected to each of the digital signage apparatuses 7.

Since configurations related to information distribution systems 1 in the respective mobile terminals 4 are substantially the same, one mobile terminal 4 is representatively illustrated in FIG. 2.

The mobile terminal 4 is, for example, a mobile phone, a smartphone, a tablet terminal, or the like carried by a user including the owner of the vehicle 3. The mobile terminal 4 includes a communication apparatus 41, a processing apparatus 42, a GPS module 43, an acceleration sensor 44, and a touch panel display (hereinafter simply referred to as "display") 45.

The communication apparatus 41 is a device that performs bidirectional communication with the center server 5 over a predetermined communication network NW3 under the control of the processing apparatus 42 (specifically, a communication processing unit 421 to be described below). The communication apparatus 41 is, for example, a mobile communication module conforming to a communication standard such as LTE (Long Term Evolution), 4G (4th Generation), or 5G (5th Generation).

The processing apparatus 42 performs various control processes in the mobile terminal 4. The processing apparatus 42 may be mainly configured of, for example, a computer including a CPU, a RAM, a ROM, an auxiliary storage device, an I/O, and the like. The processing apparatus 42 includes the communication processing unit 421, a sensor information acquisition unit 422, a moving means determination unit 423, and a terminal movement information transmission unit 424 as functional units that are realized by executing one or more programs stored in the ROM or the auxiliary storage device on the CPU.

The communication processing unit 421 controls the communication apparatus 41 and performs transmission and reception of various signals to and from the center server 5.

The sensor information acquisition unit 422 acquires sensor information input from various sensors such as the GPS module 43 and the acceleration sensor 44 from the buffer in the RAM or the like. Specifically, the sensor information acquisition unit 422 acquires the position information of the mobile terminal 4 input from the GPS module 43. The sensor information acquisition unit 422 acquires information on the acceleration (acceleration information) of the mobile terminal 4 input from the acceleration sensor 44.

The moving means determination unit 423 determines whether the user carrying the mobile terminal 4 is moving by the vehicle serving as moving means or is moving by a moving means (walking, bicycle, electric train, or the like) other than the vehicle using any method. For example, the moving means determination unit 423 may perform the determination by applying an identifier learned by machine in advance so that a case where the user is moving by the vehicle serving as moving means or a case where the user is moving by moving means other than the vehicle can be identified based on the acceleration information input from the acceleration sensor 44. For example, the moving means determination unit 423 may determine whether the user is moving by a vehicle as moving means or is moving by moving means other than the vehicle based on the position information of the mobile terminal 4 input from the GPS module 43 in addition to or instead of the acceleration information input from the acceleration sensor 44.

The terminal movement information transmission unit 424 generates information on the movement of the mobile terminal 4, that is, information on the movement of the user carrying the mobile terminal 4 (terminal movement information) and transmits the information to the center server 5 via the communication processing unit 421. The terminal movement information includes position information of the mobile terminal 4, time information corresponding to the position information, and a determination result (for example, presence or absence of a vehicle movement tag indicating that the vehicle is moving) of the moving means determination unit 423.

The terminal movement information transmitted from the mobile terminal 4 to the center server 5 may not include the time information corresponding to the position information, like the probe information transmitted from the vehicle 3 to the center server 5. In this case, the center server 5 may use a transmission time of the terminal movement information in the mobile terminal 4, a reception time of the terminal movement information in the center server 5, an estimation time corresponding to the position information of the mobile terminal 4 that is calculated from the above-described time, or the like as the time information corresponding to the terminal movement information, like the probe information. The center server 5 may add the time information to the terminal movement information as time information corresponding to the terminal movement information received from the mobile terminal 4.

The center server 5 includes a communication apparatus 51 and a processing apparatus 52, as in the first embodiment.

The communication apparatus 51 is a device that performs bidirectional communication with each of the vehicles 3, the digital signage apparatuses 7, and the mobile terminals 4 over predetermined communication networks NW1 to NW3 under the control of the processing apparatus 52 (specifically, the communication processing unit 5201).

The processing apparatus 52 includes, for example, a communication processing unit 5201, a vehicle movement information accumulation processing unit 5202, a number-of-passes specifying unit 5203, a target digital signage information acquisition unit 5204, a target vehicle detector 5205, a visual recognition frequency information acquisition unit 5206, an information distribution unit 5207, a terminal movement information accumulation processing unit 5209, a getting-on vehicle extraction unit 5210, a usage vehicle specifying unit 5211, and a vehicle getting-on specifying unit 5212 as functional units that are realized by executing one or more programs stored in the ROM or the auxiliary storage device on the CPU. The processing apparatus 52 includes, for example, a storage unit 5200 as a storage area defined in an auxiliary storage device of the server computer or an external storage device connected to the server computer. In the storage unit 5200, a map information DB 5200A, a probe information DB 5200B, a vehicle movement history DB 5200C, a vehicle information DB 5200D, a digital signage information DB 5200E, a number-of-passes information DB 5200F, an advertisement DB 5200G a terminal movement history DB 5200I, a terminal information DB 5200J, and a usage vehicle DB 5200K are stored.

The terminal movement information accumulation processing unit 5209 (an example of a movement history information collection unit) performs a process of accumulating terminal movement information sequentially received from the respective mobile terminals 4 by the communication processing unit 5201 as the movement history of the mobile terminal 4 (terminal movement history) in the terminal movement history DB 5200I.

The process in the terminal movement information accumulation processing unit 5209 may be executed in real time in correspondence with the terminal movement information sequentially received from the respective mobile terminals 4 by the communication processing unit 5201 or may regularly be executed for unprocessed terminal movement information accumulated to some extent in a buffer such as a RAM.

The getting-on vehicle extraction unit 5210 extracts the vehicles 3 on which the users of the mobile terminals 4 have got on based on the vehicle movement history of the vehicle 3 and the terminal movement history of the mobile terminals 4 accumulated in the vehicle movement history DB 5200C and the terminal movement history DB 5200I. In other words, the getting-on vehicle extraction unit 5210 extracts the vehicle 3 having a getting-on record of the users of the respective mobile terminals 4 from among the vehicles 3.

For example, the getting-on vehicle extraction unit 5210 determines whether or not two following conditions are satisfied based on the terminal movement history of each mobile terminal 4 in the terminal movement history DB 5200I and the vehicle movement history, that is, trip information group of each vehicle 3 in the vehicle movement history DB 5200C.

Specifically, firstly, the getting-on vehicle extraction unit 5210 determines whether or not a staying record condition indicating that there is a staying record of the mobile terminal 4 is satisfied at a departure place and a destination of the vehicle 3. More specifically, the getting-on vehicle extraction unit 5210 determines whether or not the terminal movement history of the mobile terminal 4 indicates that the mobile terminal has stayed in the vicinity of the departure place within a predetermined time (for example, 10 minutes) before the time of activation of the vehicle 3, that is, an ACC-ON time in the trip information of the vehicle 3. The getting-on vehicle extraction unit 5210 determines whether or not the terminal movement history of the mobile terminal 4 indicates that the mobile terminal has stayed in the vicinity of the destination within a predetermined time (for example, 10 minutes) after the time of stop of the vehicle 3, that is, an ACC-OFF time in the trip information of the vehicle 3. Accordingly, the getting-on vehicle extraction unit 5210 can determine that the mobile terminal 4 has stayed in the vicinity of each of the departure place and the destination of the vehicle 3 in a time period during which the vehicle 3 has been parked at each of the departure place and the destination.

Secondly, the getting-on vehicle extraction unit 5210 determines whether or not a synchronous movement condition indicating that there is the mobile terminal at the same position on a movement route from the departure place to the destination at the same time as the vehicle 3 is satisfied. More specifically, the getting-on vehicle extraction unit 5210 compares a data group of the vehicle movement information (time information and position information) between the departure place and the destination included in the trip information of the vehicle 3 with a data group of the terminal movement information (time information and position information) included in the terminal movement history of the mobile terminal 4 in the same time period as that of the above data group. The getting-on vehicle extraction unit 5210 determines that the synchronous movement condition is satisfied when there are a plurality of matchings between the vehicle movement information of the vehicle 3 and the terminal movement information of the mobile terminal 4 at which a determination can be made that the mobile terminal 4 and the vehicle 3 have existed at the same position at the same time.

That is, the getting-on vehicle extraction unit 5210 can extract the vehicle 3 on which the user of the mobile terminal 4 has got, by searching for the trip information of the vehicle 3 in which both the stay record condition and the synchronous moving condition are satisfied with respect to the terminal movement history of each of the mobile terminals 4.

The getting-on vehicle extraction unit 5210 may extract the vehicle 3 having a getting-on record of the user of the mobile terminal 4 using solely the synchronous movement condition without using the stay record condition. The getting-on vehicle extraction unit 5210 may execute the above-described process in real time according to updating of the vehicle movement history DB 5200C and the terminal movement history DB 5200I in the vehicle movement information accumulation processing unit 5202 and the terminal movement information accumulation processing unit 5209. The getting-on vehicle extraction unit 5210 may regularly execute the above-described process for an unprocessed vehicle movement history and an unprocessed terminal movement history accumulated to some extent.

The usage vehicle specifying unit 5211 specifies the vehicles 3 to be used by users of the respective mobile terminals 4. The vehicle 3 to be used by the user of the mobile terminal 4 includes not only the vehicle 3 that is used by a driver, but also the vehicle 3 that is used by a passenger. Specifically, the usage vehicle specifying unit 5211 specifies the vehicles 3 to be used by the respective users of the mobile terminals 4 from the vehicles 3 on which the respective users of the mobile terminals 4 have got, that is, that have a getting-on record, which are extracted by the getting-on vehicle extraction unit 5210. The usage vehicle specifying unit 5211 stores the respective mobile terminals 4 or the respective users of the mobile terminals 4, and the specified vehicles 3 to be used by the respective users of the mobile terminals 4 in association with each other in the usage vehicle DB 5200K. Hereinafter, the description will be given on the premise that the mobile terminal 4 and the vehicle 3 to be used by the user of the mobile terminal 4 are stored in association with each other in the usage vehicle DB 5200K. In this case, the usage vehicle specifying unit 5211 also stores a getting-on frequency (the number of times of getting-on) of the specified vehicles 3 to be used by the users of the respective mobile terminals 4 in the usage vehicle DB 5200K. That is, the usage vehicle specifying unit 5211 constructs the usage vehicle DB 5200K in an aspect in which the respective mobile terminals 4 are associated with the vehicles 3 to be used by the users of the respective mobile terminals 4 with the getting-on frequency (the number of times of getting-on) indicating a relationship. For example, the usage vehicle DB 5200K can be constructed as a graph type database in which the respective vehicles 3 and the respective mobile terminals 4 are set as nodes and the getting-on frequency is set as relationship information.

As described above, the getting-on vehicle extraction unit 5210 executes a process of extracting the user having a getting-on history in one of the vehicles 3 in real time or regularly according to the updating of the vehicle movement history DB 5200C and the terminal movement history DB 5200I. Therefore, the usage vehicle specifying unit 5211 updates the usage vehicle DB 5200K according to the result of the extraction process which is sequentially executed by the getting-on vehicle extraction unit 5210. Specifically, when the vehicle 3 is newly extracted by the getting-on vehicle extraction unit 5210 by the user of the mobile terminal 4 getting on the vehicle 3 having no getting-on record so far, the usage vehicle specifying unit 5211 stores the user of the mobile terminal 4 and the vehicle 3 in association with each other in the usage vehicle DB 5200K. When the vehicle 3 is newly extracted by the getting-on vehicle extraction unit 5210 by the user of the mobile terminal 4 getting on the vehicle 3 already having a getting-on record, the usage vehicle specifying unit 5211 updates the getting-on frequency as a relationship information stored in the in the usage vehicle DB 5200K.

The usage vehicle DB 5200K may be constructed as a general relational database instead of a graph type database.

The vehicle getting-on specifying unit 5212 specifies whether or not the user of the mobile terminal 4 is currently getting on the vehicle 3 to be used by the user of the mobile terminal 4, based on an association relationship between the mobile terminals 4 and the vehicles 3 stored in the usage vehicle DB 5200K. For example, the vehicle getting-on specifying unit 5212 compares the current terminal movement information of the respective mobile terminals 4 with the current vehicle movement information of the vehicle 3 associated with the respective mobile terminals 4 in the usage vehicle DB 5200K in real time. Accordingly, the vehicle getting-on specifying unit 5212 may monitor solely the vehicle movement history of the vehicle 3 specified as being used by the user of the mobile terminal 4 in the usage vehicle DB 5200K in advance and can specify whether or not the user of the mobile terminal 4 is getting on the vehicle 3 in a realistic processing time.

The number-of-passes specifying unit 5203 calculates, for the respective digital signage apparatuses 7, the total number of times the users of the respective mobile terminals 4 pass through the vicinity of the digital signage apparatus 7 while in the vehicle (total number of passes). For example, the number-of-passes specifying unit 5203 calculates the total number of passes based on the information on the installation position of the respective digital signage apparatuses 7 registered in the digital signage information DB 5200E and the terminal movement history of the respective mobile terminals 4 stored in the terminal movement history DB 5200I. In this case, the number-of-passes specifying unit 5203 can determine whether or not the user of the mobile terminal 4 has got on the vehicle based on the presence or absence of the vehicle movement tag included in each piece of terminal movement information constituting the terminal movement history of the terminal movement history DB 5200I. The number-of-passes specifying unit 5203 stores the calculated total number of passes in the number-of-passes information DB 5200F in association with the identification information (for example, a terminal ID) of the mobile terminal 4 and the identification information on the digital signage apparatus 7 corresponding thereto.

The identification information of each mobile terminal 4 is stored in the terminal information DB 5200J in which various types of information of each mobile terminal 4 is registered in advance.

When the number of passes is not registered in the number-of-passes information DB 5200F for a certain digital signage apparatus 7 and a certain mobile terminal 4, the number-of-passes specifying unit 5203 first calculates the number of passes. On the other hand, when the number of passes is registered in the number-of-passes information DB 5200F, the number-of-passes specifying unit 5203 regularly calculates the number of times (the number of passes to be added) the mobile terminal has passed through the vicinity of the digital signage apparatus 7 with respect to the unprocessed terminal movement history of the mobile terminal 4. The number-of-passes specifying unit 5203 updates the number-of-passes information DB 5200F by adding the newly calculated number of times (the number of passes to be added) the mobile terminal has passed through the vicinity of the digital signage apparatus 7 to the number of passes that has already been registered.

The visual recognition frequency information acquisition unit 5206 acquires information on the visual recognition frequency (visual recognition frequency information) of the digital signage apparatus 7 of the occupant getting on the target vehicle (the vehicle 3) detected by the target vehicle detector 5205. In the fourth embodiment, the visual recognition frequency information acquisition unit 5206 acquires, as the visual recognition frequency information, the total number of times the target occupant passes through the vicinity of the digital signage apparatus 7 while in the vehicle (total number of passes) from the number-of-passes information DB 5200F.

Specifically, first, the vehicle getting-on specifying unit 5212 specifies whether or not the user of the mobile terminal 4 stored in the usage vehicle DB 5200K as a user of the target vehicle (the vehicle 3) is getting on the target vehicle. When the vehicle getting-on specifying unit 5212 specifies that the user of the mobile terminal 4 is getting on the target vehicle, the visual recognition frequency information acquisition unit 5206 acquires the total number of passes of the user of the mobile terminal 4 from the number-of-passes information DB 5200F as the total number of passes of the occupant of the target vehicle.

The users of the mobile terminals 4 may be stored in the usage vehicle DB 5200K as users of the target vehicle. In this case, the visual recognition frequency information acquisition unit 5206 acquires the total number of passes of the respective users of the specified mobile terminals 4 when the vehicle getting-on specifying unit 5212 specifies that the users of the mobile terminals 4 are getting on the target vehicle.

The information distribution unit 5207 changes the content of the advertisement information to be displayed on the digital signage apparatus 7 based on the total number of times the target occupant passed through the vicinity of the digital signage while in the vehicle, which is acquired by the visual recognition frequency information acquisition unit 5206.

For example, when the total number of passes of the occupant getting on the target vehicle is relatively small with respect to a certain digital signage apparatus 7, specifically, when the total number of passes is smaller than the predetermined threshold value, the information distribution unit 5207 displays the basic information and the position guidance information among the pieces of individual information that can be included in the advertisement information on the digital signage apparatus 7. On the other hand, when the total number of passes of the occupant getting on the target vehicle is relatively large, specifically, when the total number of passes is equal to or larger than the predetermined threshold value, the information distribution unit 5207 displays at least one of the basic information, the latest information, the detailed information, and the supplementary information among the pieces of individual information that can be included in the advertisement information on the digital signage apparatus 7. Accordingly, it is possible to further curtail tiredness of occupants having a relatively high visual recognition frequency of the digital signage apparatus 7 and to further improve effects of providing information, as in the embodiment described above.

For example, when there is a plurality of occupants getting on the target vehicle, the information distribution unit 5207 may change the content of the advertisement information based on whether an average value of the total number of passes of the respective occupants is relatively large or small. For example, the information distribution unit 5207 may perform a determination as to whether the total number of passes of the respective occupants is relatively large or small and change the content of the advertisement information based on which of a determination result indicating that the total number of passes is relatively large and a determination result indicating that the total number of passes is relatively small is frequent.

Details of Operation of Information Distribution System

A specific operation of the information distribution system 1 according to the fourth embodiment will be described with reference to FIG. 12.

Figure 12:
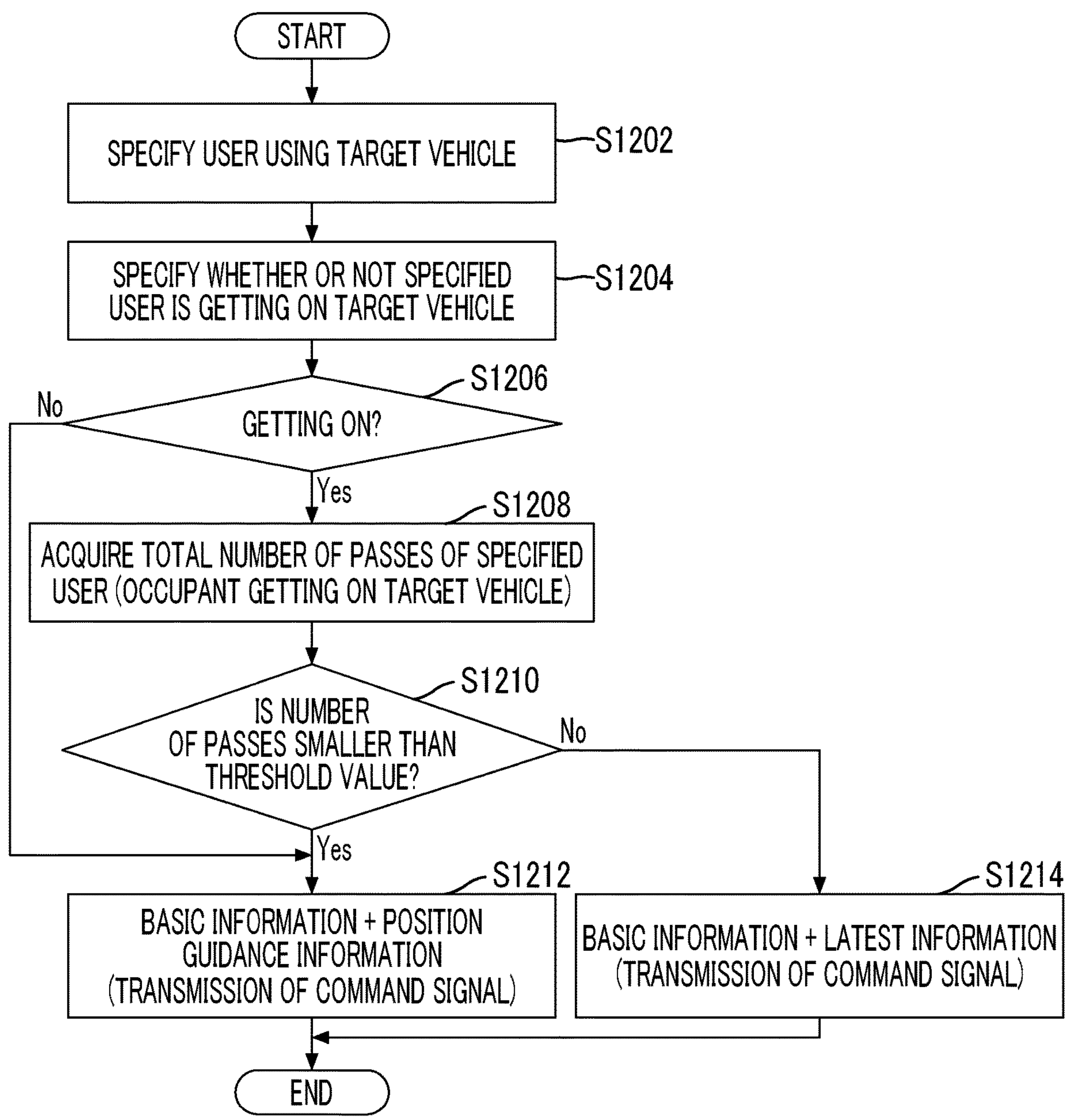
FIG. 12 is a flowchart schematically illustrating an example of a process in the center server according to the fourth embodiment.

FIG. 12 is a flowchart schematically illustrating an example of a process in the processing apparatus 52 of the center server 5 according to the fourth embodiment.

In step S1202, the information distribution unit 5207 specifies the user of the mobile terminal 4 using the target vehicle (the vehicle 3) from the usage vehicle DB 5200K.

In step S1204, the vehicle getting-on specifying unit 5212 specifies whether or not the user specified in step S1202 is getting on the target vehicle.

In step S1206, the information distribution unit 5207 determines whether or not the vehicle getting-on specifying unit 5212 specifies that the user is getting on the target vehicle. The information distribution unit 5207 proceeds to step S1208 when the vehicle getting-on specifying unit 5212 specifies that the user is getting on the target vehicle, and to step S1212 when the vehicle getting-on specifying unit 5212 specifies that the user is not getting on the target vehicle.

In this example, when the user of the mobile terminal 4 using the target vehicle is not getting on the target vehicle (No in step S1206), the process may proceed to the processes of steps S502 to S508 of FIG. 5 using the total number of passes of the target vehicle, as in the first embodiment. In this case, the number-of-passes specifying unit 5203 calculates, for the respective digital signage apparatuses 7, the total number of times the respective vehicles 3 have passed through the digital signage apparatus 7 and stores the total number of passes in the number-of-passes information DB 5200F, as in the first embodiment, in addition to the total number of times the users of the respective mobile terminals 4 pass through the digital signage apparatus 7.

In step S1208, the visual recognition frequency information acquisition unit 5206 acquires the total number of times the user of the mobile terminal 4 specified in step S1202 (that is, the occupant getting on the target vehicle) has passed through the vicinity of the digital signage apparatus 7 from the number-of-passes information DB 5200F.

In step S1210, the information distribution unit 5207 determines whether or not the total number of times the user of the mobile terminal 4 getting on the target vehicle has passed through the vicinity of the digital signage apparatus 7 is smaller than a predetermined threshold value. The information distribution unit 5207 proceeds to step S1212 when the total number of passes is smaller than the predetermined threshold value, and to step S1214 when the total number of passes is equal to or greater than the predetermined threshold value.

Since steps S1212 and S1214 are the same as steps S506 and S508 in the first embodiment (FIG. 5), description thereof will be omitted.

Operation

As described above, in the fourth embodiment, the information distribution unit 5207 changes the content of the information to be displayed on the digital signage apparatus 7 according to the visual recognition frequency information on the frequency at which the occupant of the target vehicle visually recognizes the digital signage apparatus 7.

Specifically, the terminal movement information accumulation processing unit 5209 collects terminal movement information including position information from the respective mobile terminals 4 carried by the users including the occupant getting on the target vehicle and stores the terminal movement information in the terminal movement history DB 5200I as a terminal movement history. The visual recognition frequency information acquisition unit 5206 acquires, as the visual recognition frequency information, the number of times the target occupant passes through the vicinity of the digital signage apparatus 7 while in the vehicle, which is calculated based on the terminal movement history. The information distribution unit 5207 changes the content of the information to be displayed on the digital signage apparatus 7 according to the number of passes acquired by the visual recognition frequency information acquisition unit 5206.

As described above, the center server 5 can acquire the number of times the occupant has passed through the vicinity of the digital signage apparatus 7, which is calculated based on the terminal movement history of the mobile terminal 4 carried by the occupant getting on the target vehicle detected in the vicinity of the digital signage apparatus 7. Accordingly, the center server 5 can change the content of the information to be displayed on the digital signage apparatus 7 specifically in consideration of the visual recognition frequency of the digital signage apparatus 7 of the occupant of the target vehicle based on the number of times the occupant getting on the target vehicle has passed through the vicinity of the digital signage apparatus 7, as in the first embodiment.

The number of times the vehicle on which the target occupant gets has passed through the vicinity of the digital signage in a situation in which the target occupant can grasp the content of the digital signage apparatus 7 (the number of visually recognizable passes) in the total number of times the target occupant has passed through the vicinity of the digital signage apparatus 7 while in the vehicle may be used as the visual recognition frequency information, as in the second embodiment. In this case, the visual recognition determination unit 5208 determines whether or not the user is in a situation in which the user can grasp the content of the digital signage apparatus 7 when the user of each mobile terminal 4 passes through the vicinity of the digital signage apparatus 7 while in the vehicle. Specifically, the visual recognition determination unit 5208 determines whether or not the visual recognition is possible each time the number-of-passes specifying unit 5203 has determined that the user has got on the vehicle and has passed through the vicinity of the digital signage apparatus 7 with respect to a user of a certain digital signage apparatus 7 and a certain mobile terminal 4.

The residential place information of the target occupant getting on the target vehicle may be used as the visual recognition frequency information, as in the third embodiment. In this case, the visual recognition frequency information acquisition unit 5206 may acquire the residential place information of the target occupant from among the residential place information of the users of the respective mobile terminals 4 registered in the terminal information DB 5200J in advance. The information distribution unit 5207 may change the content of the information to be displayed on the digital signage apparatus 7 according to the residential place information of the target occupant, as in the third embodiment.

Fifth Embodiment

A fifth embodiment will be described.

An information distribution system 1 according to the fifth embodiment is different from that according to the first embodiment in that the content of the information on the digital signage apparatus 7 is changed according to the information on the visit history (visit history information) indicating that the target vehicle has visited the place related to the advertisement information displayed on the digital signage apparatus 7. Specifically, the information distribution system 1 according to the fifth embodiment is different from that according to the first embodiment in that a visit history specifying unit 5213, a visit history information acquisition unit 5214, and a visit history DB 5200L are added in the processing apparatus 52 of the center server 5. Hereinafter, configurations that are the same as or correspond to those of the first embodiment are denoted by the same reference numerals, and different parts will be mainly described.

Configuration of Information Distribution System

First, a configuration of the information distribution system 1 according to the fourth embodiment will be described with reference to FIG. 13.

Figure 13:
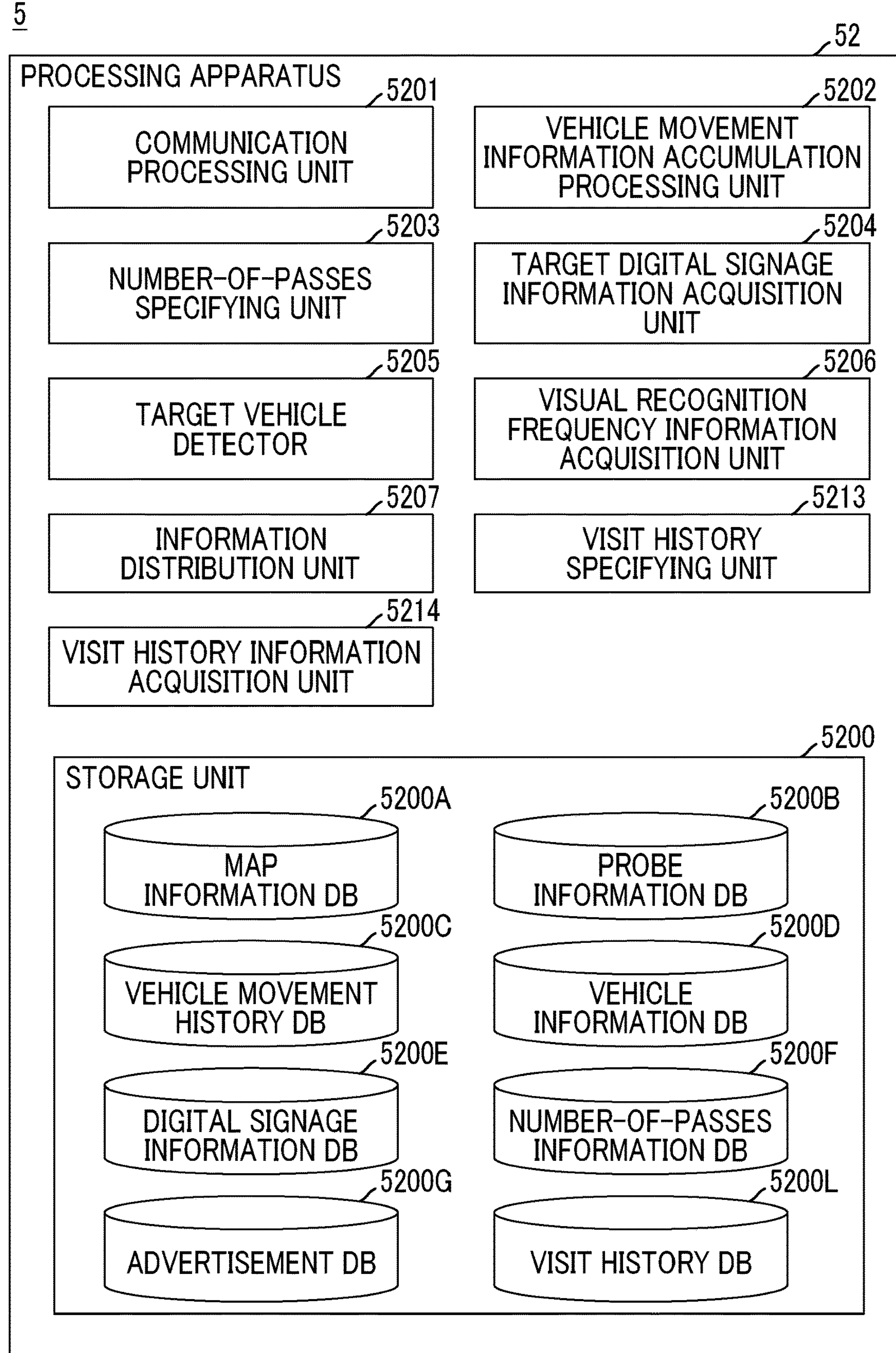
FIG. 13 is a functional block diagram schematically illustrating an example of a functional configuration of a center server according to a fifth embodiment.

FIG. 13 is a functional block diagram schematically illustrating an example of a functional configuration of a center server 5 according to the fourth embodiment.

An overall configuration of the information distribution system 1 according to the fourth embodiment and the functional configuration of the vehicle 3 according to the fourth embodiment are shown by FIGS. 1 and 2, as in the first embodiment.

The center server 5 includes a communication apparatus 51 and a processing apparatus 52, as in the first embodiment.

The processing apparatus 52 includes a communication processing unit 5201, a vehicle movement information accumulation processing unit 5202, a number-of-passes specifying unit 5203, a target digital signage information acquisition unit 5204, a target vehicle detector 5205, a visual recognition frequency information acquisition unit 5206, and an information distribution unit 5207 as functional units that are realized by executing one or more programs stored in the ROM or the auxiliary storage device on the CPU. The processing apparatus 52 includes, for example, a storage unit 5200 as a storage area defined in an auxiliary storage device of the server computer or an external storage device connected to the server computer. In the storage unit 5200, the map information DB 5200A, the probe information DB 5200B, the vehicle movement history DB 5200C, the vehicle information DB 5200D, the digital signage information DB 5200E, the number-of-passes information DB 5200F, the advertisement DB 5200G and the visit history DB 5200L are stored.

The visit history specifying unit 5213 specifies whether or not each of the vehicles 3 has visited the place related to the advertisement object of the advertisement information with respect to the advertisement information to be displayed on any of the digital signage apparatuses 7 stored in the advertisement DB 5200G Specifically, the place related to the advertisement object of the advertisement information is a store that sells advertisement object products, or provides a service, a store that is an advertisement object, a facility, or the like. The visit history specifying unit 5213 specifies whether or not each of the vehicles 3 has visited the place related to the advertisement object based on the map information DB 5200A and the vehicle movement history DB 5200C. When each of the vehicles 3 has visited the place related to the advertisement object, the visit history specifying unit 5213 specifies (counts) the number of visits. The visit history specifying unit 5213 stores visit history information including the presence or absence of a visit history for the place related to the advertisement object and the number of visits in the visit history DB 5200L in association with the identification information of the vehicle 3 and the identification information (for example, an advertisement ID) of the advertisement information corresponding thereto.

As described above, since the vehicle movement history DB 5200C is appropriately updated, the process in the visit history specifying unit 5213 may be executed according to the updating of the vehicle movement history DB 5200C. The process in the visit history specifying unit 5213 may be regularly executed with respect to the unprocessed vehicle movement history DB 5200C.

The visit history information acquisition unit 5214 acquires the visit history information indicating whether or not the target vehicle detected by the target vehicle detector 5205 has visited the place related to the advertisement object of the advertisement information displayed on the digital signage apparatus 7 from the visit history DB 5200L.

The information distribution unit 5207 changes the content of the information displayed on the digital signage apparatus 7 according to the visit history information of the target vehicle acquired by the visit history information acquisition unit 5214.

For example, when the visit history information indicates that the target vehicle has not visited the place related to the advertisement object of the advertisement information displayed on the digital signage apparatus 7, the information distribution unit 5207 displays the basic information and the position guidance information related to the advertisement object on the digital signage apparatus 7. Accordingly, it is possible to provide the basic information and the position guidance information which are basic information for causing the advertisement object to be recognized, to the occupant of the target vehicle likely not to have visited the place related to the advertisement object. On the other hand, when the visit history information indicates that the target vehicle has visited the place related to the advertisement object of the advertisement information displayed on the digital signage apparatus 7, the information distribution unit 5207 displays the basic information related to the advertisement object and at least one of the detailed information, the supplementary information, and the latest information on the digital signage apparatus 7. Accordingly, it is possible to further curtail tiredness of the occupant of the target vehicle likely to have visited the place related to the advertisement object, and further improve effects of providing information through the digital signage apparatus 7.

Details of Operation of Information Distribution System

A specific operation of the information distribution system 1 according to the fourth embodiment will be described with reference to FIG. 14.

Figure 14:
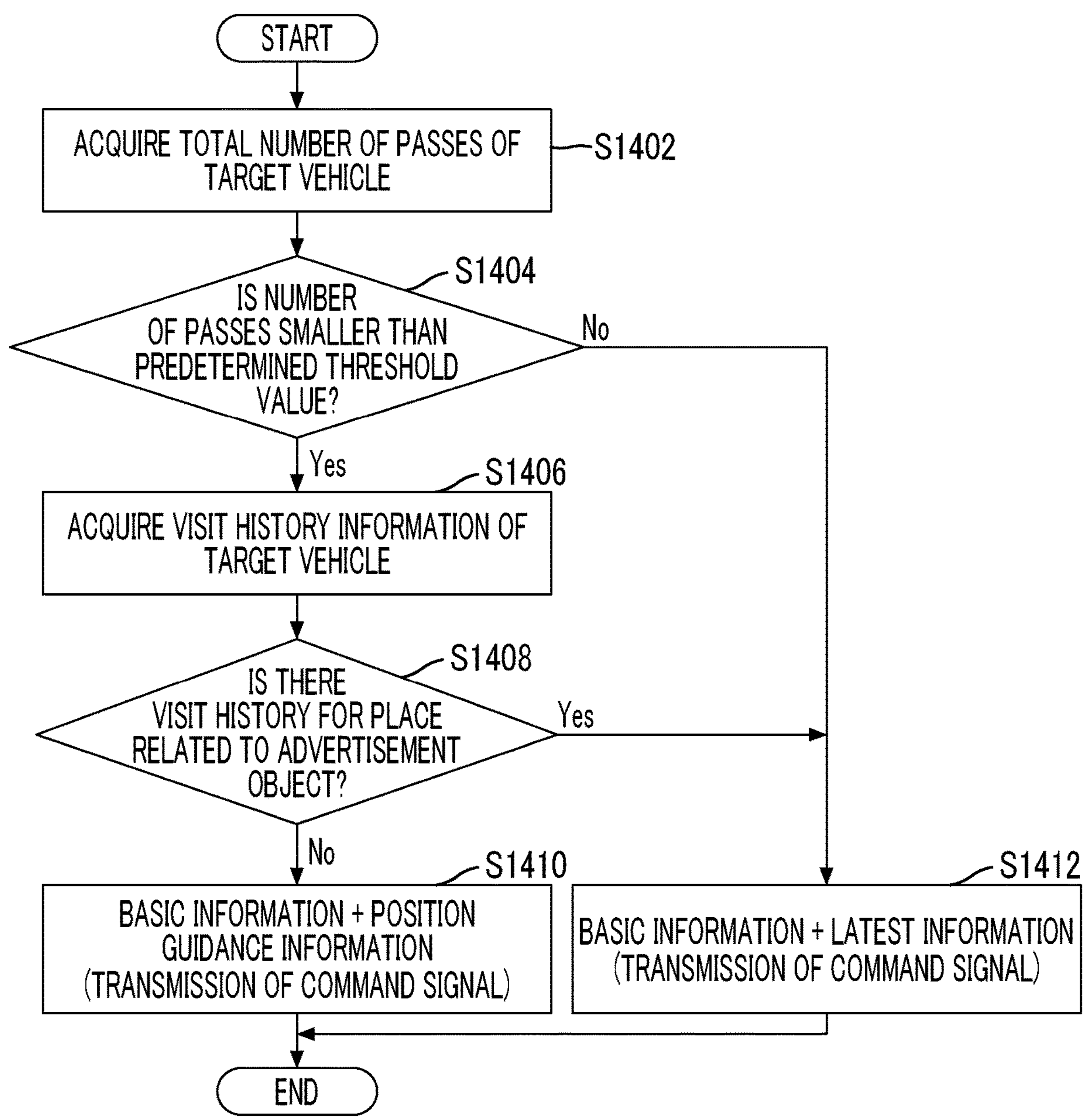
FIG. 14 is a flowchart schematically illustrating an example of a process in the center server according to the fifth embodiment.

FIG. 14 is a flowchart schematically illustrating an example of a process in the information distribution system 1 according to the fourth embodiment.

Steps S1402 and S1404 are the same as steps S502 and S504 of the first embodiment (FIG. 5), and thus description thereof will be omitted.

When the total number of passes of the digital signage apparatus 7 of the target vehicle is equal to or smaller than the predetermined number of times (Yes in step S1404), the visit history information acquisition unit 5214 acquires visit history information of the target vehicle with respect to the place related to the advertisement object of the advertisement information displayed on the digital signage apparatus 7 from the visit history DB 5200L in step S1406.

In step S1408, the information distribution unit 5207 determines whether or not the target vehicle has visited the place related to the advertisement object based on the acquired visit history information. The information distribution unit 5207 proceeds to step S1410 when the target vehicle has not visited the place related to the advertisement object and proceeds to step S1412 when the target vehicle has visited the place related to the advertisement object.

Steps S1410 and S1412 are the same as steps S506 and S508 of the first embodiment (FIG. 5), and thus description thereof will be omitted.

In the example, the information distribution unit 5207 may change the content of information to be displayed on the digital signage apparatus 7 according to the number of times the target vehicle visits the place related to the advertisement object. That is, the visit history information acquisition unit 5214 may acquire, as the visit history information, information on the number of times the target vehicle visits the place related to the advertisement object from the visit history DB 5200L. For example, the information distribution unit 5207 may make the content of the information displayed on the digital signage apparatus 7 different between a case where the number of visits is relatively large and a case where the number of visits is relatively small. Specifically, in step S1408, the information distribution unit 5207 may perform a process of determining whether or not the number of times the target vehicle visits the place related to the advertisement object is equal to or smaller than a predetermined number of times, instead of the above process. The information distribution unit 5207 may proceed to step S1410 when the number of visits is equal to or smaller than the predetermined number of times, and to step S1412 when the number of visits exceeds the predetermined number of times.

In this example, the number of visually recognizable passes may be used as the visual recognition frequency information instead of the total number of passes of the target vehicle, as in the second embodiment. A total number of passes of an occupant getting on the target vehicle or the number of visually recognizable passes may be used as the visual recognition frequency information instead of the total number of passes of the target vehicle, as in the fourth embodiment.

In this example, although the information distribution unit 5207 changes the content displayed on the digital signage apparatus 7 according to both the visual recognition frequency information and the visit history information, the information distribution unit 5207 may change the content displayed on the digital signage apparatus 7 according to solely the visit history information. In this case, steps S1402 and S1404 are omitted.

Operation

As described above, in the fourth embodiment, the vehicle movement information accumulation processing unit 5202 collects the vehicle movement information including the position information from the vehicles 3 including the target vehicle, and stores the vehicle movement information as the vehicle movement history (trip information) in the vehicle movement history DB 5200C. The visit history information acquisition unit 5214 acquires the visit history information on the visit history indicating that the target vehicle visits the place related to a predetermined target of the information displayed on the digital signage apparatus 7, which is generated based on the vehicle movement history by the visit history specifying unit 5213. The information distribution unit 5207 changes the content of the information to be displayed on the digital signage apparatus 7 based on the visit history information.

As described above, the center server 5 can change the content to be displayed on the digital signage apparatus 7 in consideration of the visit history of the target vehicle with respect to the place related to the predetermined target of the information to be displayed on the digital signage apparatus 7, such as a store where target products of the advertisement information are sold or a target facility of the advertisement information. Therefore, for example, when the target vehicle has not visited, a target store of the advertisement information, the center server 5 can display basic information such as a brand name and basic information such as position guidance information on the digital signage apparatus 7 in order to cause the target store to be recognized. On the other hand, when the target vehicle has visited the target store of the advertisement information, the center server 5 can display additional information such as supply information on the digital signage apparatus 7 in order to cause interest. Therefore, it is possible to further curtail tiredness of the occupant of the vehicle passing through the vicinity of the digital signage apparatus 7 and to further improve effects of providing information through the digital signage apparatus 7.

In the fourth embodiment, the visit history information acquisition unit 5214 acquires, as the visit history information, information on whether or not the target vehicle has visited the place related to the predetermined target of the information displayed on the digital signage apparatus 7. When the visit history information indicates that the target vehicle has not visited the place, the information distribution unit 5207 displays the basic information related to the predetermined target and the position guidance information of the place on the digital signage apparatus 7. On the other hand, when the visit history information indicates that the target vehicle has visited the place, the information distribution unit 5207 displays at least one of the basic information, detailed information related to the predetermined target, the supplementary information, and the latest information on the digital signage apparatus 7.

As described above, the center server 5 can cause an occupant who has not visited the place related to the predetermined target to recognize basic information related to the target such as a target of the information and the place related to the target. On the other hand, the center server 5 can provide the detailed information, the supplementary information, the latest information, and the like in addition to the basic information, instead of the position guidance information, to the occupant who has visited the place related to the predetermined target and, specifically, further curtail tiredness of the occupant to further improve effects of providing information through the digital signage apparatus 7.

In the fourth embodiment, the center server 5 may select different advertisement information from among a plurality of pieces of advertisement information having different advertisement objects instead of changing the combination of the individual information constituting the advertisement information on the same advertisement object to thereby change the content of the information to be displayed on the digital signage apparatus 7. In this case, the information distribution unit 5207 may display the candidate information related to the place indicated by the visit history information indicating the fact that the target vehicle has not visited, among the pieces of predefined candidate information on the digital signage apparatus 7. When there are two or more pieces of candidate information related to the place that the target vehicle has not visited, which is indicated by the visit history information, the information distribution unit 5207 may display the candidate information with the highest priority among the priorities predefined for the respective pieces of candidate information among the pieces of candidate information on the digital signage apparatus 7.

Accordingly, the center server 5 can display the candidate information related to the place where there is no visit history of the target vehicle among the pieces of candidate information, that is, candidate information that the occupant of the target vehicle is likely not to know on the digital signage apparatus 7. It is possible to preferentially display the candidate information with a relatively high priority on the digital signage apparatus 7 by appropriately defining the priorities for the respective pieces of candidate information in advance.

In the fourth embodiment, visit history information on a visit history indicating that the target occupant has visited the place related to the information displayed on the digital signage apparatus 7 may be used instead of the visit history information of the target vehicle. In this case, for example, the center server 5 may collect the terminal movement information including the position information from the respective mobile terminals 4 carried by users including the occupant getting on the target vehicle and store the terminal movement information in the storage unit 5200 as the terminal movement history, similar to the terminal movement information accumulation processing unit 5209 of the fourth embodiment. The visit history specifying unit 5213 may specify whether or not the user of each mobile terminal 4 has visited the place related to the advertisement object of the advertisement information with respect to the advertisement information displayed on any one of the digital signage apparatuses 7 based on the terminal movement history. The visit history specifying unit 5213 may specify (count) the number of visits when the user of each mobile terminal 4 has visited the place related to the advertisement object. The visit history specifying unit 5213 may store visit history information including the presence or absence of a visit history for the place related to the advertisement object and the number of visits in the visit history DB 5200L in association with the identification information of the mobile terminal 4 and the identification information (for example, an advertisement ID) of the advertisement information corresponding thereto.

The embodiment for carrying out the present disclosure has been described in detail above, but the present disclosure is not limited to the specific embodiments described above, and various modifications and changes can be performed within the scope of the gist of the present disclosure described in the claims.

For example, in the embodiment described above, although the information to be displayed on the digital signage apparatus 7 changes in a stepwise manner in two display patterns, an aspect in which the information may change in a stepwise manner in three or more display patterns may be adopted.

In the embodiment described above, some or all of the functions of the target vehicle detector 5205, the visual recognition frequency information acquisition unit 5206, and the visit history information acquisition unit 5214, and a function corresponding to a part of the information distribution unit 5207 that changes the content to be displayed on the digital signage apparatus 7 may be provided in the digital signage apparatus 7. In this case, the digital signage apparatus 7 (the visual recognition frequency information acquisition unit 5206 and the visit history information acquisition unit 5214) can acquire the visual recognition frequency information, the visit history information, and the like by performing an inquiry to the center server 5.

In the embodiment described above, although the advertisement information is displayed on the digital signage apparatus 7, any information other than the advertisement information may be displayed. For example, any information such as information on public events or the like in an area in which the digital signage apparatus 7 is installed may be displayed on the digital signage apparatus 7. In this case, the same operation and effects can be obtained by changing the content of the information to be displayed on the digital signage apparatus 7, as in the embodiment described above.

What is claimed is:

1. A digital signage control device comprising circuitry configured to:

display information on a digital signage installed in a vicinity of a predetermined road;

detect a target vehicle located in a predetermined range on the road in which an occupant visually recognizes the digital signage; and acquire visual recognition frequency information on a frequency at which the occupant of the target vehicle visually recognizes the information on the digital signage, wherein the circuitry is configured to change content of information to be displayed on the digital signage according to the visual recognition frequency information.

2. The digital signage control device according to claim 1, wherein the circuitry is configured to collect movement history information including position information from the target vehicle or a mobile terminal carried by a target occupant getting on the target vehicle, wherein the circuitry is configured to acquire:

the number of times the target vehicle passes through a vicinity of the digital signage specified based on the movement history information as the visual recognition frequency information; or the number of times the target occupant passes through the vicinity of the digital signage while in the vehicle specified based on the movement history information as the visual recognition frequency information; and wherein the circuitry is configured to change the content of the information to be displayed on the digital signage according to the number of passes acquired by the circuitry.

3. The digital signage control device according to claim 2, wherein the circuitry is configured to determine:

whether or not the occupant getting on the target vehicle is in a situation in which the occupant grasps the content of the digital signage when the target vehicle has passed through the vicinity of the digital signage; or whether or not the target occupant is in a situation in which the occupant grasps the content of the digital signage when the vehicle on which the target occupant gets passes through the vicinity of the digital signage, wherein the circuitry is configured to acquire:

the number of times the target vehicle passes through the vicinity of the digital signage in a situation in which a result of the determination by the determination unit corresponds to a positive determination, from among a total number of times the target vehicle passes through the vicinity of the digital signage; or the number of times the vehicle on which the target occupant gets passes through the vicinity of the digital signage in a situation in which the result of the determination by the determination unit corresponds to a positive determination, from among a total number of times the target occupant passes through the vicinity of the digital signage while in the vehicle.

4. The digital signage control device according to claim 3, wherein the circuitry is configured to determine that the occupant getting on the target vehicle or the target occupant is in a situation in which the occupant is unable to grasp the content of the digital signage when at least one of following condition i), ii) and iii) is satisfied during the target vehicle or the vehicle on which the target occupant gets passes through the vicinity of the digital signage, i) a vehicle speed of the target vehicle or the vehicle on which the target occupant gets is equal to or higher than a predetermined speed, ii) the digital signage is in a backlit state when the digital signage is viewed from the occupant getting on the target vehicle or the target occupant, and iii) surroundings of the digital signage is under a predetermined bad weather.

5. The digital signage control device according to claim 2, wherein the circuitry is configured to:

display basic information related to a predetermined target and position guidance information of a place related to the predetermined target when the number of passes acquired by the circuitry is relatively small; and display the basic information and at least one of detailed information, supplementary information, and latest information related to the target on the digital signage when the number of passes acquired by the circuitry.

6. The digital signage control device according to claim 2, wherein a plurality of pieces of candidate information that is a candidate to be displayed on the digital signage are predefined and priorities are predefined in the pieces of candidate information, and wherein the circuitry is configured to:

display candidate information having a relatively higher priority among the pieces of candidate information on the digital signage when the number of passes acquired by the circuitry is relatively small; and display candidate information having a relatively lower priority among the pieces of candidate information on the digital signage when the number of passes acquired by the circuitry is relatively large.

7. The digital signage control device according to claim 1, wherein:

the circuitry is configured to acquire, as the visual recognition frequency information, attribute information on whether or not an owner of the target vehicle or a target occupant getting on the target vehicle is a resident in a predetermined area including an installation position of the digital signage; and the circuitry is configured to make content of information to be displayed on the digital signage different between a case where the owner or the target occupant is the resident in the area and a case where the owner or the target occupant is not the resident in the area, based on the attribute information.

8. The digital signage control device according to claim 1, wherein the circuitry is configured to:

collect movement history information including position information from the target vehicle or a mobile terminal carried by the target occupant getting on the target vehicle, acquire visit history information on a visit history indicating that the target vehicle or the target occupant has visited a place related to a predetermined target in information to be displayed on the digital signage, the visit history information being generated based on the movement history information, and change content of the information to be displayed on the digital signage based on the visit history information.

9. The digital signage control device according to claim 8, wherein the circuitry is configured to acquire information on whether or not the target vehicle or the target occupant has visited the place as the visit history information; and wherein the circuitry is configured to:

display basic information related to the predetermined target and position guidance information on the place on the digital signage when the visit history information indicates that the target vehicle or the target occupant has not visited the place; and display the basic information, and at least one of detailed information, supplementary information, and latest information related to the predetermined target on the digital signage when the visit history information indicates that the target vehicle or the target occupant has visited the place.

10. The digital signage control device according to claim 8, wherein:

the circuitry is configured to acquire information on whether or not the target vehicle or the target occupant has visited the place as the visit history information; and the circuitry is configured to display candidate information related to the place indicated by the visit history information as a place that the target vehicle or the target occupant has not visited among a plurality of predefined candidate information on the digital signage.

11. A digital signage control method comprising:

displaying information on a digital signage installed in a vicinity of a predetermined road;

detecting a target vehicle located in a predetermined range on the road in which an occupant visually recognizes the digital signage; and acquiring visual recognition frequency information on a frequency at which the occupant of the target vehicle visually recognizes the information on the digital signage, wherein, in the displaying of the information, content of information to be displayed on the digital signage is changed according to the visual recognition frequency information.

12. A non-transitory computer-readable storage medium storing a program causing a computer to execute a display control step of displaying information on a digital signage installed in a vicinity of a predetermined road, a target vehicle detection step of detecting a target vehicle located in a predetermined range on the road in which an occupant visually recognizes the digital signage, and a visual recognition frequency information acquisition step of acquiring visual recognition frequency information on a frequency at which the occupant of the target vehicle visually recognizes the information on the digital signage, wherein in the display control step, content of information to be displayed on the digital signage is changed according to the visual recognition frequency information.

* * * * *